(12) United States Patent
Mano et al.

(10) Patent No.: US 11,194,023 B2
(45) Date of Patent: Dec. 7, 2021

(54) IMAGE ACQUIRING APPARATUS FOR VEHICLE, CONTROL DEVICE, VEHICLE HAVING IMAGE ACQUIRING APPARATUS FOR VEHICLE OR CONTROL DEVICE, AND IMAGE ACQUIRING METHOD FOR VEHICLE

(71) Applicant: KOITO MANUFACTURING CO., LTD., Tokyo (JP)

(72) Inventors: Mitsuharu Mano, Shizuoka (JP); Takanori Namba, Shizuoka (JP); Osamu Endo, Shizuoka (JP); Masayasu Ito, Shizuoka (JP); Yuji Higashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 462 days.

(21) Appl. No.: 16/065,074

(22) PCT Filed: Dec. 1, 2016

(86) PCT No.: PCT/JP2016/085814
§ 371 (c)(1),
(2) Date: Jun. 21, 2018

(87) PCT Pub. No.: WO2017/110417
PCT Pub. Date: Jun. 29, 2017

(65) Prior Publication Data
US 2019/0004150 A1 Jan. 3, 2019

(30) Foreign Application Priority Data

Dec. 21, 2015 (JP) .................................. 2015-248826
Dec. 21, 2015 (JP) .................................. 2015-248827
Dec. 21, 2015 (JP) ............................. JP2015-248828

(51) Int. Cl.
*G01S 7/48* (2006.01)
*G01S 7/484* (2006.01)
(Continued)

(52) U.S. Cl.
CPC ............ *G01S 7/484* (2013.01); *G01S 7/4868* (2013.01); *G01S 17/18* (2020.01); *G01S 17/42* (2013.01); *G01S 17/89* (2013.01); *G01S 17/931* (2020.01)

(58) Field of Classification Search
CPC ........ G01S 7/484; G01S 17/89; G01S 17/894; G01S 7/4868; G01S 17/18; G01S 7/4802; G01S 17/931; G01S 17/42
See application file for complete search history.

(56) References Cited

U.S. PATENT DOCUMENTS 3,895,388 A 7/1975 Townsend
5,029,009 A 7/1991 Ulich et al.
(Continued)

FOREIGN PATENT DOCUMENTS

CN 1345095 A 4/2002
CN 1744789 A 3/2006
(Continued)

OTHER PUBLICATIONS

International Search Report issued in PCT/JP2016/085814 dated Feb. 28, 2017 (10 pages).
(Continued)

*Primary Examiner* — Luke D Ratcliffe
(74) *Attorney, Agent, or Firm* — Osha Bergman Watanabe & Burton LLP

(57) ABSTRACT

An image acquiring apparatus for a vehicle includes a light emitting unit configured to emit pulse light to a predetermined direction, an image acquisition unit configured to acquire a plurality of different images of target distance (Continued)

ranges by imaging reflected light returning from the target distance ranges at imaging timings set according to the target distance ranges, and a timing controller configured to control a light emission cycle of the pulse light and the imaging timings. The timing controller is configured to set a light emission interval time to be longer than a delay time which is a time from a light emission start time point of the light emitting unit to an imaging start time point of the image acquisition unit and is required to image a longest-distance range of the target distance ranges from which the reflected light can be imaged.

11 Claims, 15 Drawing Sheets

(51) Int. Cl.
*G01S 17/89* (2020.01)
*G01S 7/486* (2020.01)
*G01S 17/18* (2020.01)
*G01S 17/42* (2006.01)
*G01S 17/931* (2020.01)

(56) References Cited

U.S. PATENT DOCUMENTS

| | | | |
|---|---|---|---|
| 5,118,180 | A | 6/1992 | Wichmann et al. |
| 5,864,391 | A | 1/1999 | Hosokawa et al. |
| 6,115,511 | A | 9/2000 | Sakai et al. |
| 6,311,020 | B1 | 10/2001 | Torikoshi |
| 7,956,988 | B1 | 6/2011 | Moran |
| 10,203,399 | B2 | 2/2019 | Retterath et al. |
| 2002/0039087 | A1 | 4/2002 | Inukai |
| 2002/0051128 | A1 | 5/2002 | Aoyama |
| 2002/0052711 | A1 | 5/2002 | Aoyama |
| 2002/0149694 | A1 | 10/2002 | Seo |
| 2003/0155513 | A1* | 8/2003 | Remillard ............... G01S 17/18 250/341.8 |
| 2006/0050979 | A1 | 3/2006 | Kawahara |
| 2006/0055244 | A1 | 3/2006 | Ito et al. |
| 2006/0171703 | A1 | 8/2006 | Abe et al. |
| 2006/0215040 | A1 | 9/2006 | Sugawara |
| 2007/0058038 | A1 | 3/2007 | David et al. |
| 2007/0200747 | A1 | 8/2007 | Okai et al. |
| 2008/0007429 | A1 | 1/2008 | Kawasaki et al. |
| 2008/0157678 | A1 | 7/2008 | Ito et al. |
| 2009/0040500 | A1 | 2/2009 | Nishiushi |
| 2010/0053365 | A1 | 3/2010 | Abe et al. |
| 2010/0109938 | A1 | 5/2010 | Oswald et al. |
| 2010/0181914 | A1 | 7/2010 | Kasaba et al. |
| 2010/0207806 | A1 | 8/2010 | Takahashi et al. |
| 2010/0283845 | A1 | 11/2010 | Yokochi et al. |
| 2011/0091197 | A1 | 4/2011 | Lee et al. |
| 2011/0311130 | A1 | 12/2011 | Ichimori |
| 2012/0002050 | A1 | 1/2012 | Taniguchi et al. |
| 2012/0069176 | A1 | 3/2012 | Park et al. |
| 2012/0075534 | A1 | 3/2012 | Katz et al. |
| 2012/0200757 | A1 | 8/2012 | Kasahara |
| 2012/0249781 | A1 | 10/2012 | Vollmerhausen |
| 2012/0307230 | A1 | 12/2012 | Dorrington et al. |
| 2012/0320219 | A1 | 12/2012 | David et al. |
| 2013/0004021 | A1 | 1/2013 | Nagaoka et al. |
| 2013/0188022 | A1 | 7/2013 | Katz et al. |
| 2014/0139133 | A1 | 5/2014 | Kawasaki |
| 2014/0375815 | A1 | 12/2014 | Kanou et al. |
| 2015/0022712 | A1 | 1/2015 | Koishi |
| 2015/0125032 | A1 | 5/2015 | Yamanaka et al. |
| 2015/0160340 | A1 | 6/2015 | Grauer et al. |
| 2015/0202939 | A1 | 7/2015 | Stettner et al. |
| 2015/0241564 | A1 | 8/2015 | Takano |
| 2016/0012307 | A1 | 1/2016 | Morishita |
| 2016/0061952 | A1 | 3/2016 | Tsuji et al. |
| 2016/0182832 | A1 | 6/2016 | Koishi |
| 2016/0344965 | A1 | 11/2016 | Grauer et al. |
| 2016/0365846 | A1 | 12/2016 | Wyland |
| 2017/0156673 | A1 | 6/2017 | Uchida et al. |
| 2017/0212220 | A1 | 7/2017 | Dahlmann |

FOREIGN PATENT DOCUMENTS

| | | | |
|---|---|---|---|
| CN | 1765120 | A | 4/2006 |
| CN | 1838731 | A | 9/2006 |
| CN | 1977527 | A | 6/2007 |
| CN | 101209691 | A | 7/2008 |
| CN | 101324749 | A | 12/2008 |
| CN | 101644887 | A | 2/2010 |
| CN | 101784147 | A | 7/2010 |
| CN | 101933065 | A | 12/2010 |
| CN | 102043224 | A | 5/2011 |
| CN | 102316306 | A | 1/2012 |
| CN | 202305416 | U | 7/2012 |
| CN | 102629972 | A | 8/2012 |
| CN | 102737389 | A | 10/2012 |
| CN | 102783144 | A | 11/2012 |
| CN | 102792333 | A | 11/2012 |
| CN | 103744078 | A | 4/2014 |
| CN | 104041022 | A | 9/2014 |
| CN | 104364824 | A | 2/2015 |
| CN | 104380166 | A | 2/2015 |
| DE | 60125683 | T2 | 4/2007 |
| DE | 102009045600 | A1 | 4/2011 |
| JP | S56164969 | A | 12/1981 |
| JP | S59-117981 | U1 | 8/1984 |
| JP | 559198377 | A | 11/1984 |
| JP | H04-215089 | A | 8/1992 |
| JP | H07-043451 | A | 2/1995 |
| JP | H07325152 | A | 12/1995 |
| JP | H08065690 | A | 3/1996 |
| JP | H09-257927 | A | 10/1997 |
| JP | H09-274076 | A | 10/1997 |
| JP | H10132932 | A | 5/1998 |
| JP | 2000172995 | A | 6/2000 |
| JP | 2004-157061 | A | 6/2004 |
| JP | 2005-271836 | A | 10/2005 |
| JP | 2007232498 | A | 9/2007 |
| JP | 2007271373 | A | 10/2007 |
| JP | 2008-033872 | A | 2/2008 |
| JP | 2008-070999 | A | 3/2008 |
| JP | 2008-298741 | A | 12/2008 |
| JP | 2009031165 | A | 2/2009 |
| JP | 2009092555 | A | 4/2009 |
| JP | 2009192359 | A | 8/2009 |
| JP | 2009-257983 | A | 11/2009 |
| JP | 2009257981 | A | 11/2009 |
| JP | 2009258015 | A | 11/2009 |
| JP | 2010-054461 | A | 3/2010 |
| JP | 2010-066221 | A | 3/2010 |
| JP | 2010048716 | A | 3/2010 |
| JP | 2010061304 | A | 3/2010 |
| JP | 2010170449 | A | 8/2010 |
| JP | 2010212042 | A | 9/2010 |
| JP | 2010256291 | A | 11/2010 |
| JP | 2011013950 | A | 1/2011 |
| JP | 2011136651 | A | 7/2011 |
| JP | 2012220366 | A | 11/2012 |
| JP | 2013-096905 | A | 5/2013 |
| JP | 2013096905 | * | 5/2013 ............. G01S 17/10 |
| JP | 2013160585 | A | 8/2013 |
| JP | 2013546222 | A | 12/2013 |
| JP | 2014160408 | A | 9/2014 |
| JP | 2015510586 | A | 4/2015 |
| JP | 2015135273 | A | 7/2015 |
| WO | 2014097539 | A1 | 6/2014 |
| WO | 2014/178376 | A1 | 11/2014 |
| WO | 2015001550 | A1 | 1/2015 |

OTHER PUBLICATIONS

Written Opinion issued in PCT/JP2016/085814 dated Feb. 28, 2017 (7 pages).

(56) References Cited

OTHER PUBLICATIONS

Extended European Search Report issued in counterpart European Patent Application No. 16878310.8, dated Jul. 22, 2019 (7 pages).
Office Action issued in Japanese Application No. 2017-557836, dated Jun. 30, 2020 (13 pages).
Office Action issued in Japanese Application No. 2017-557836, dated Oct. 13, 2020 (19 pages).
Office Action issued in Chinese Application No. 201680075256.6, dated Jun. 22, 2021 (30 pages).
Extended European Search Report issued in European Patent Application No. 16878307.4, dated Jul. 22, 2019 (7 pages).
International Search Report issued in PCT/JP2016/085811 dated Feb. 28, 2017 (2 pages).
Written Opinion issued in PCT/JP2016/085811 dated Feb. 28, 2017 (7 pages).
Office Action issued in Chinese Application No. 201680074554.3, dated Dec. 5, 2019 (14 pages).
Extended European Search Report issued in European Application No. 16878309.0, dated Jul. 22, 2019 (7 pages).
Lin, D. et al.; "Color Range Images Captured by a Four-Phase CMOS Image Sensor", IEEE Transactions on Electron Devices, vol. 58, No. 3, Mar. 2011, pp. 732-739 (8 pages).
International Search Report issued in PCT/JP2016/085813 dated Feb. 21, 2017 (2 pages).
Written Opinion issued in PCT/JP2016/085813 dated Feb. 21, 2017 (5 pages).
Office Action issued in Japanese Application No. 2017-557832, dated Jan. 5, 2021 (16 pages).
Office Action issued in Japanese Application No. 2017-557832, dated Jun. 30, 2020 (18 pages).
Extended European Search Report issued in European Patent Application No. 16878306.6, dated Jul. 22, 2019 (7 pages).
International Search Report issued in PCT/JP2016/085810 dated Feb. 28, 2017 (9 pages).
Written Opinion issued in PCT/JP2016/085810 dated Feb. 28, 2017 (6 pages).
Office Action issued in Chinese Application No. 201680075213.8; dated Jun. 3, 2021 (22 pages).
Office Action issued in Japanese Application No. 2017-557837, dated Oct. 13, 2020 (13 pages).
Extended European Search Report issued in European Patent Application No. 16878311.6, dated Jul. 22, 2019 (6 pages).
International Search report issued in PCT/JP2016/085815 dated Feb. 28, 2017 (9 pages).
Written Opinion of the International Searching Authority issued in PCT/JP2016/085815 dated Feb. 28, 2017 (5 pages).
Office Action issued in Chinese Application No. 201680075214.2, dated Jun. 16, 2021 (25 pages).
Office Action issued in corresponding Chinese Application No. 201680074579.3, dated Aug. 30, 2021 (18 pages).

* cited by examiner

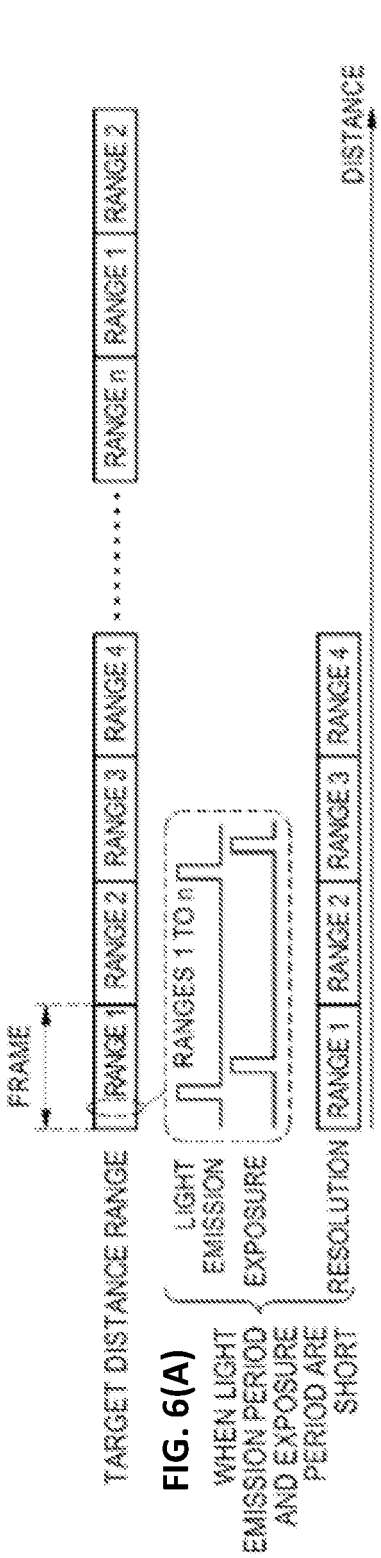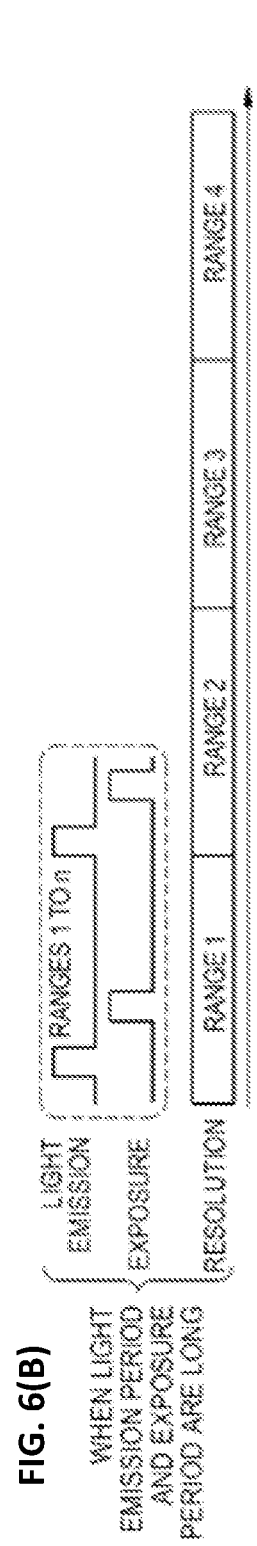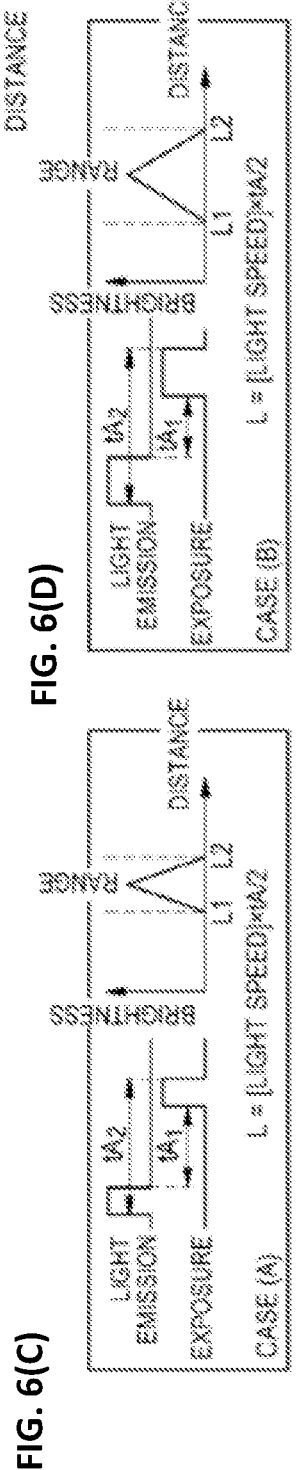
FIG. 6(A)
FIG. 6(B)
FIG. 6(C)
FIG. 6(D)

IMAGE ACQUIRING APPARATUS FOR VEHICLE, CONTROL DEVICE, VEHICLE HAVING IMAGE ACQUIRING APPARATUS FOR VEHICLE OR CONTROL DEVICE, AND IMAGE ACQUIRING METHOD FOR VEHICLE

CROSS-REFERENCE TO RELATED APPLICATIONS

This application is claims priority to Japanese Patent Application No. 2015-248826 filed on Dec. 21, 2015, Japanese Patent Application No. 2015-248827 filed on Dec. 21, 2015, and Japanese Patent Application No. 2015-248828 filed on Dec. 21, 2015, the contents of which are incorporated herein by reference in their entirety.

BACKGROUND

Technical Field

This disclosure relates to an image acquiring apparatus for a vehicle, a control device, a vehicle having the image acquiring apparatus for a vehicle or the control device, and an image acquiring method for a vehicle.

Related Art

Patent Document 1 discloses a distance image data generating apparatus for a vehicle, which emits pulse light forward from a vehicle having the distance image data generating device in a predetermined cycle and images reflected light from target distances at imaging timings set according to the target distances, thereby acquiring a plurality of different images of the target distances, and generates distance image data representing the distance to an object of each pixel, based on the luminance of the same pixel in the images.

Patent Document 2 discloses a visibility condition determining apparatus for a vehicle, which determines whether there is a fog and the like in sight by determining the visibility condition of the outside of a vehicle based on the luminance gradients of non-irradiation areas in images acquired by cameras mounted on the vehicle when light devices irradiate the outside of the vehicle.

Further, there are known an apparatus for recognizing the surrounding environments of a vehicle having the apparatus by imaging reflected light of night illumination light from a lamp such as a head lamp by a camera mounted on the vehicle in the case of performing imaging of the periphery of the vehicle, for example, at night, in order to perform automated control on the vehicle, driving assistance for the driver, and so on. Also, in such apparatus, in the case where illumination intensity for imaging required for a camera mounted on a vehicle to take images cannot be obtained only by a night lamp for securing direct visibility like a head lamp, a vehicle running condition detecting apparatus further having an auxiliary lamp is used (refer to Patent Document 3 for instance).

Patent Document 1: JP-A-2009-257983
Patent Document 2: JP-A-2008-33872
Patent Document 3: JP-A-2005-271836

SUMMARY OF THE INVENTION

The distance image data generating apparatus for a vehicle disclosed in Patent Document 1 images a desired distance range (for example, 0 m to 200 m in front of the vehicle) with a predetermined distance resolution. The desired distance range and the predetermined distance resolution depend on the light emission period of pulse light, the reflected-light imaging (exposure) period, and the delay time from the start time point of light emission to the end time point of exposure. In order to acquire as bright a frame image as possible (with high luminance), it is desired to repeat light emission and exposure many times. To this end, it can be considered to minimize the light emission interval time and the exposure interval time. However, if the interval times are shortened, besides reflected light caused by light emission to a desired target distance, reflected light caused by light emission to a target distance immediately before the desired target distance may be imaged. Therefore, unnecessary images of target distances may be acquired.

The visibility condition determining apparatus for a vehicle disclosed in Patent Document 2 merely determines whether there is a fog and cannot acquire information on the depth of fog.

In the case of performing imaging using night illumination light by a camera mounted on a vehicle, images which are acquired by imaging a near range from the illumination light source are bright since the amount of reflected light is large, whereas images which are acquired by imaging a far range of the illumination light source are dark since the amount of reflected light is small.

Accordingly one or more embodiments of the present invention provides an image acquiring apparatus for a vehicle, a control device, a vehicle having the image acquiring apparatus for a vehicle or the control device, and an image acquiring method for a vehicle, capable of preventing an unnecessary image of a target distance range from being acquired.

Also, one or more embodiments of the present invention provides an image acquiring apparatus for a vehicle, a control device, a vehicle having the image acquiring apparatus for a vehicle or the control device, and an image acquiring method for a vehicle, capable of acquiring detailed visibility information particularly in a bad weather.

Further, one or more embodiments of the present invention provides an image acquiring apparatus for a vehicle, a control device, a vehicle having the image acquiring apparatus for a vehicle or the control device, and an image acquiring method for a vehicle, capable of acquiring images of a near range and a far range from a vehicle, equivalent in contrast.

An image acquiring apparatus for a vehicle according to one or more embodiments of the present invention includes: a light emitting unit configured to emit pulse light to a predetermined direction; an image acquisition unit configured to acquire a plurality of different images of target distance ranges by imaging reflected light returning from the target distance ranges at imaging timings set according to the target distance ranges; and a timing control unit configured to control a light emission cycle of the pulse light and the imaging timings, wherein the timing control unit is configured to set a light emission interval time to be longer than a delay time which is a time from a light emission start time point of the light emitting unit to an imaging start time point of the image acquisition unit and is required to image a longest-distance range of the target distance ranges from which the reflected light can be imaged.

According to the above-mentioned configuration, it may be possible to prevent an unnecessary image of a target distance range from being acquired.

The delay time which is required to image the longest-distance range may be determined from a light emission intensity and a diffusion angle of the pulse light and a sensitivity of the image acquisition unit.

By using the above-mentioned parameters, it may be possible to easily calculate the delay time required to image the longest-distance range.

The light emitting unit may be configured to decrease the light emission intensity to image a short-distance range of the target distance ranges and increase the light emission intensity to image a long-distance range.

According to the above-mentioned configuration, it may be possible to prevent an image of the long-distance range from becoming darker as compared to the short-distance range.

Also, according to one or more embodiments of the present invention, a control device for controlling an image acquiring apparatus for a vehicle includes a light emitting unit configured to emit pulse light to a predetermined direction, and an image acquisition unit configured to acquire a plurality of different images of target distance ranges by imaging reflected light returning from the target distance ranges at imaging timings set according to the target distance ranges, and is configured to set a light emission interval time to be longer than a delay time which is a time from a light emission start time point of the light emitting unit to an imaging start time point of the image acquisition unit and is required to image a longest-distance range of the target distance ranges from which the reflected light can be imaged.

According to the above-mentioned configuration, it may be possible to prevent an unnecessary image of a target distance range from being acquired.

Also, a vehicle according to one or more embodiments of the present invention includes the image acquiring apparatus or the control device described above.

According to the above-mentioned configuration, it may be possible to improve the safety of a vehicle having, for example, a self-driving system.

Also, according to one or more embodiments of the present invention, an image acquiring method for a vehicle acquires a plurality of different images of target distance ranges by imaging reflected light of pulse light emitted to a predetermined direction while changing imaging timings, and includes setting a light emission interval time representing the light emission cycle of the pulse light to be longer than a delay time which is a time from a light emission start time point of the pulse light to an imaging start time point of the reflected light and is required to image a longest-distance range of the target distance ranges from which the reflected light can be imaged.

According to the above-mentioned configuration, it may be possible to prevent an unnecessary image of a target distance range from being acquired.

An image acquiring apparatus for a vehicle according to one or more embodiments of the present invention includes: a light emitting unit configured to emit pulse light to a predetermined direction; an image acquisition unit configured to acquire a plurality of different images of target distance ranges by imaging reflected light returning from the target distance ranges at imaging timings set according to the target distance ranges; and a timing control unit configured to control a light emission cycle of the pulse light and the imaging timings, wherein the image acquisition unit is configured to acquire visibility information by determining a degree of darkness of the target distance ranges from the plurality of images and determining a target distance range which cannot be visually recognized.

According to the above-mentioned configuration, it may be possible to acquire visibility information in a bad weather, particularly, information on the depth of fog when there is a fog.

The degree of darkness may be determined by setting a threshold for a luminance of each of the plurality of images.

According to the above-mentioned configuration, it may be possible to determine the depth of fog by an easy method.

The image acquisition unit may be configured to transmit the visibility information to an integrated control unit to control driving of a vehicle.

According to the above-mentioned configuration, it may be possible to use visibility information which is acquired in a bad weather such as in foggy weather, to control driving of a vehicle.

Also, according to one or more embodiments of the present invention, a control device for controlling an image acquiring apparatus for a vehicles includes a light emitting unit configured to emit pulse light to a predetermined direction, and an image acquisition unit configured to acquire a plurality of different images of target distance ranges by imaging reflected light returning from the target distance ranges at imaging timings set according to the target distance ranges, and is configured to control the image acquisition unit to acquire visibility information by determining a degree of darkness of the target distance ranges from the plurality of images and determining a target distance range which cannot be visually recognized.

According to the above-mentioned configuration, it may be possible to acquire visibility information in a bad weather, particularly, information on the depth of fog when there is a fog.

Also, according to one or more embodiments of the present invention, a vehicle includes the image acquiring apparatus or the control device described above, and an integrated control unit configured to communication with the image acquisition unit or the control device, wherein the integrated control unit is configured to perform control on the running speed of the vehicle or notify the driver based on the visibility information.

According to the above-mentioned configuration, it may be possible to use visibility information which is acquired in a bad weather such as in foggy weather, for safe running and automated driving of a vehicle.

Also, according to one or more embodiments of the present invention an image acquiring method for a vehicle acquires a plurality of different images of target distance ranges by imaging reflected light of pulse light emitted to a predetermined direction while changing imaging timings, and includes acquiring visibility information by determining a degree of darkness of the target distance ranges from the plurality of images and determining a target distance range which cannot be visually recognized.

According to the above-mentioned configuration, it may be possible to acquire visibility information in a bad weather, particularly, information on the depth of fog when there is a fog.

An image acquiring apparatus for a vehicle according to one or more embodiments of the present invention includes: a light emitting unit configured to emit pulse light to a predetermined direction; an image acquisition unit configured to acquire a plurality of different images of target distance ranges by imaging reflected light returning from the target distance ranges at imaging timings set according to the target distance ranges; and a timing control unit configured to control a light emission cycle of the pulse light and the imaging timings, wherein the light emitting unit is controlled such that a light emission intensity of the pulse light to image a far range of the target distance ranges is higher than the light emission intensity to image a near range of the target distance ranges.

According to the above-mentioned configuration, it may be possible to acquire images of a near range and a far range equivalent in contrast, and it is possible to acquire appropriate images.

The light emission intensity may be linearly changeable according to distances of the target distance ranges.

According to the above-mentioned configuration, it may be possible to acquire images uniform in contrast over the entire range of the target distance ranges.

An image acquiring apparatus for a vehicle according to one or more embodiments of the present invention includes: a light emitting unit configured to emit pulse light to a predetermined direction; an image acquisition unit configured to acquire a plurality of different images of target distance ranges by imaging reflected light returning from the target distance ranges at imaging timings set according to the target distance ranges; and a timing control unit configured to control a light emission cycle of the pulse light and the imaging timings, wherein the light emitting unit is controlled such that a light emission period of the pulse light to image a far range of the target distance ranges is longer than the light emission period to image a near range of the target distance ranges.

According to the above-mentioned configuration, it may be possible to acquire images of a near range and a far range equivalent in contrast, and it is possible to acquire appropriate images.

The light emission period may be linearly changeable according to distances of the target distance ranges.

According to the above-mentioned configuration, it may be possible to acquire images uniform in contrast over the entire range of the target distance ranges.

An image acquiring apparatus for a vehicle according one or more embodiments of the present invention includes: a light emitting unit configured to emit pulse light to a predetermined direction; an image acquisition unit configured to acquire a plurality of different images of target distance ranges by imaging reflected light returning from the target distance ranges at imaging timings set according to the target distance ranges; and a timing control unit configured to control a light emission cycle of the pulse light and the imaging timings, wherein the light emitting unit and the image acquisition unit are controlled such that a number of times of light emission of the pulse light and a number of times of imaging of the reflected light to image a far range of the target distance ranges is larger than the number of times of light emission and the number of times of imaging of the reflected light to image a near range of the target distance ranges.

According to the above-mentioned configuration, it may be possible to acquire images of a near range and a far range equivalent in contrast, and it is possible to acquire appropriate images.

The number of times of light emission and the number of times of imaging may be linearly changeable according to distances of the target distance ranges.

According to the above-mentioned configuration, it may be possible to acquire images uniform in contrast over the entire range of the target distance ranges.

According to one or more embodiments of the present invention, a control device for controlling an image acquiring apparatus for a vehicle includes a light emitting unit configured to emit pulse light to a predetermined direction, and an image acquisition unit configured to acquire a plurality of different images of target distance ranges by imaging reflected light returning from the target distance ranges at imaging timings set according to the target distance ranges, and is configured to perform at least one of controlling a light emission intensity of the pulse light such that the light emission intensity to image a far range of the target distance ranges is higher than the light emission intensity to image a near range of the target distance ranges, controlling a light emission period of the pulse light such that the light emission period to image the far range is longer than the light emission period to image the near range, and controlling a number of times of light emission of the pulse light and a number of times of imaging of the reflected light such that the number of times of light emission and the number of times of imaging to image the far range are larger than the number of times of light emission and the number of times of imaging to image the near range.

According to the above-mentioned configuration, it may be possible to acquire images of a near range and a far range equivalent in contrast, and it is possible to acquire appropriate images.

A vehicle according to one or more embodiments of the present invention includes the image acquiring apparatus described above or the control device described above, and a display unit configured to display a composite image generated by combining a plurality of images acquired by the image acquisition unit.

According to the above-mentioned configuration, by displaying composite images uniform in contrast, it may be possible to contribute to driving assistance for the driver at night or in a bad weather such as in rainy weather.

According to one or more embodiments of the present invention, an image acquiring method for a vehicle acquires a plurality of different images of target distance ranges by imaging reflected light of pulse light emitted to a predetermined direction while changing imaging timings, and includes performing at least one of controlling a light emission intensity of the pulse light such that the light emission intensity to image a far range of the target distance ranges is higher than the light emission intensity to image a near range of the target distance ranges, controlling a light emission period of the pulse light such that the light emission period to image the far range is longer than the light emission period to image the near range, and controlling a number of times of light emission of the pulse light and a number of times of imaging of the reflected light such that the number of times of light emission and the number of times of imaging to image the far range are larger than the number of times of light emission and the number of times of imaging to image the near range.

According to the above-mentioned configuration, it may be possible to acquire images of a near range and a far range equivalent in contrast, and it is possible to acquire appropriate images.

According to one or more embodiments of the present invention, it may be possible to provide an image acquiring apparatus for a vehicle, a control device, a vehicle having the image acquiring apparatus for a vehicle or the control device, and an image acquiring method for a vehicle, capable of preventing an unnecessary image of a target distance range from being acquired.

Also, according to one or more embodiments of the present invention, it may be possible to provide an image acquiring apparatus for a vehicle, a control device, a vehicle having the image acquiring apparatus for a vehicle or the control device, and an image acquiring method for a vehicle, capable of acquiring detailed visibility information particularly in a bad weather.

Also, according to one or more embodiments of the present invention, it may be possible to provide an image acquiring apparatus for a vehicle, a control device, a vehicle having the image acquiring apparatus for a vehicle or the control device, and an image acquiring method for a vehicle, capable of acquiring images of a near range and a far range from a vehicle, equivalent in contrast.

BRIEF DESCRIPTION OF DRAWINGS

FIGS. 6(A)-6(D) are views for explaining the relationship of light-emission periods and exposure periods with distance resolution.

DETAILED DESCRIPTION

Hereinafter, embodiments of the present invention will be described in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
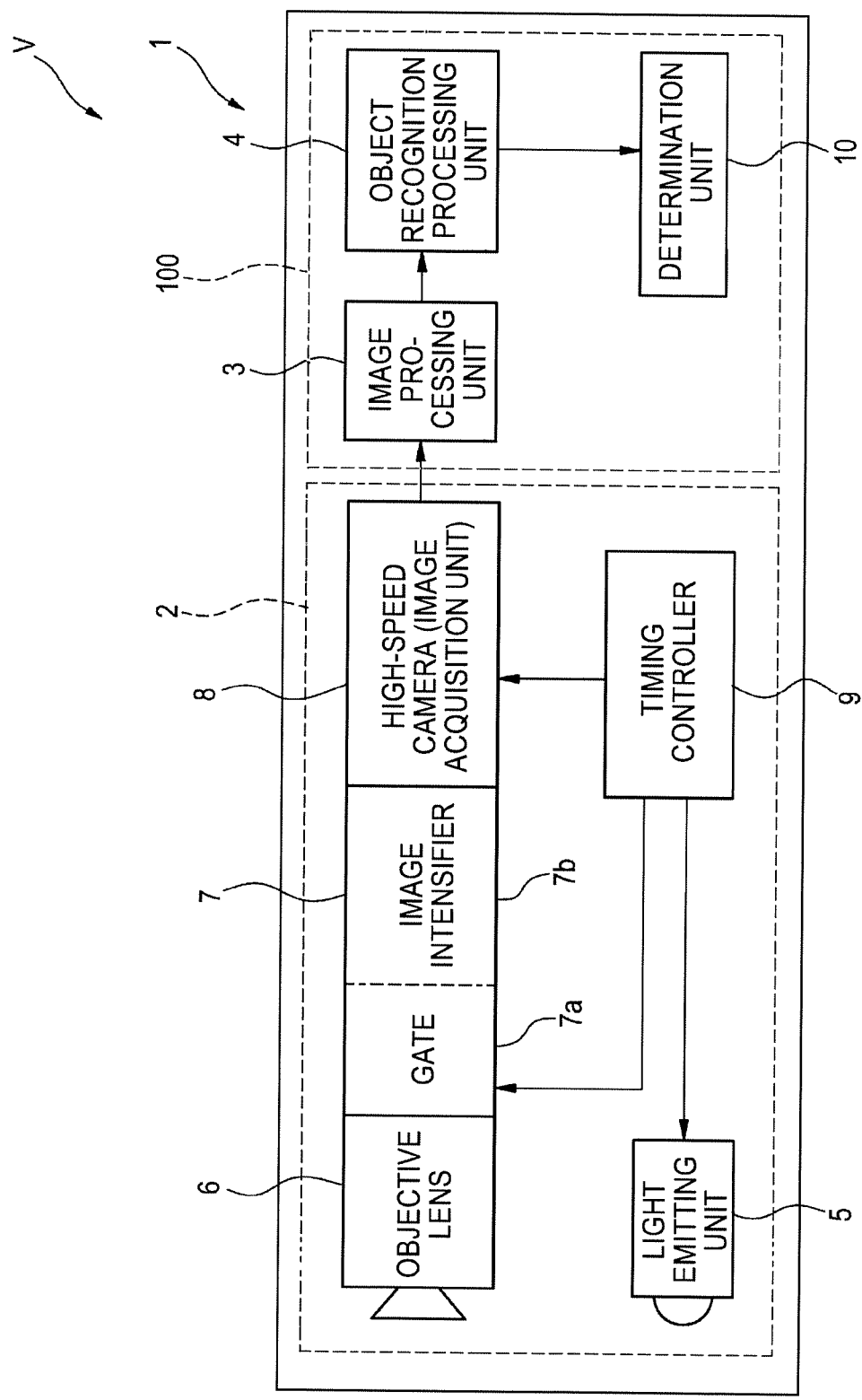
FIG. 1 is a block diagram illustrating the configuration of an obstacle detecting apparatus according to one or more embodiments of the present invention.
Figure 2:
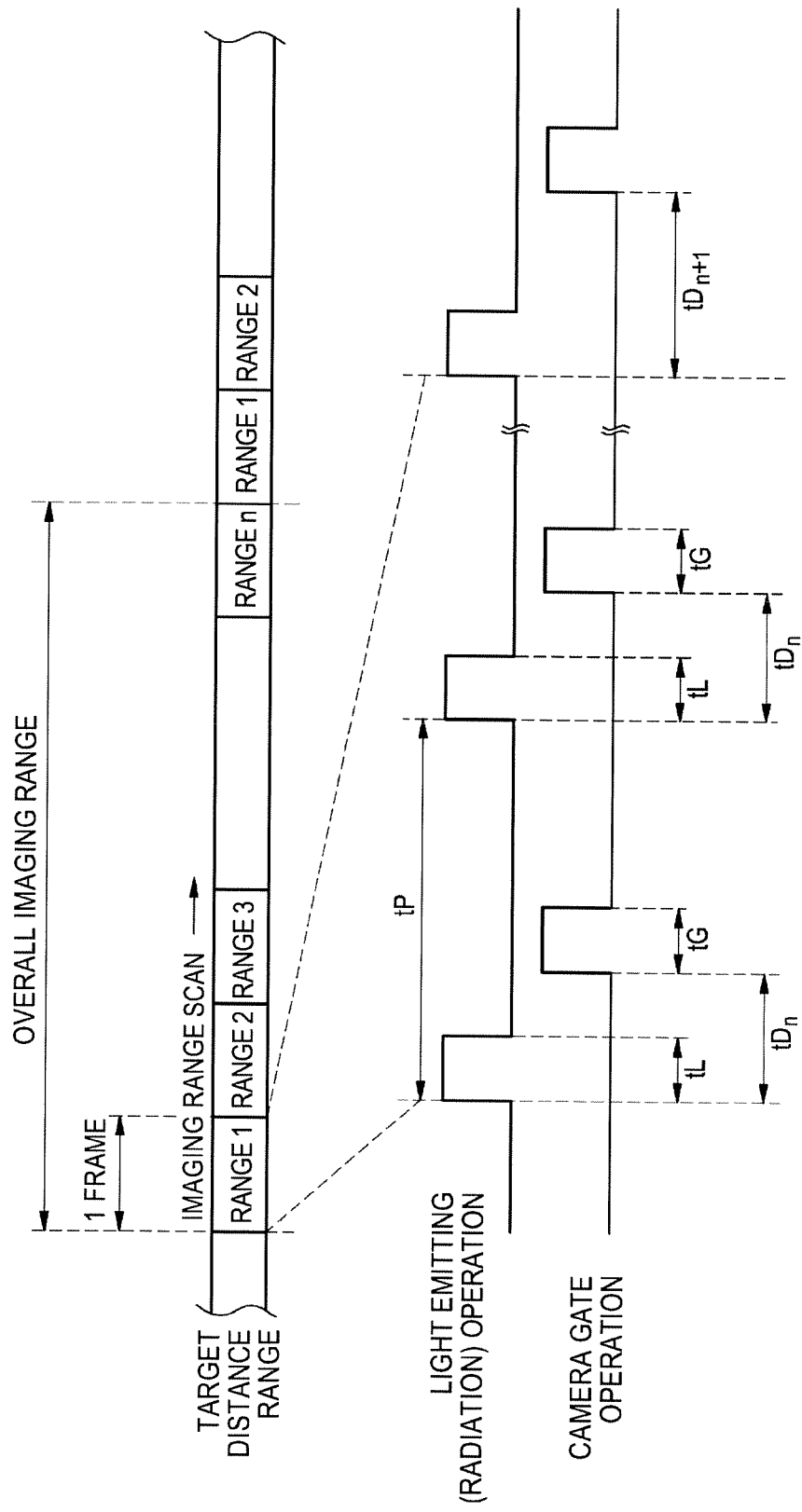
FIG. 2 is a view illustrating the temporal relationship between an operation (light emitting operation) of a light emitting unit and an operation (camera gate operation) of a gate when imaging respective target distance ranges.

FIG. 1 is a block diagram illustrating the configuration of an obstacle detecting apparatus according to one or more embodiments of the present invention using an image acquiring apparatus for a vehicle. FIG. 2 is a schematic diagram illustrating the temporal relationship between an operation (light emitting operation) of a light emitting unit and an operation (camera gate operation) of a gate when imaging respective target distance ranges.

As shown in FIG. 1, an obstacle detecting apparatus 1 which is installed in a vehicle V (the own vehicle) includes an image acquiring apparatus 2, and an integrated control unit 100 capable of communication with the image acquiring apparatus 2. The integrated control unit 100 is a unit configured to function as an ECU for a vehicle for controlling driving of the vehicle V, and in one or more embodiments of the present invention, the integrated control unit includes, for example, an image processing unit 3, an object recognition processing unit 4, and a determination unit 10.

The image acquiring apparatus 2 includes a light emitting unit 5, an objective lens 6, a light intensifying unit 7, a high-speed camera (an image acquisition unit) 8, and a timing controller (a timing control unit) 9.

The light emitting unit 5 is, for example, a near-infrared LED disposed at a front end part of the vehicle V. As shown in FIG. 2, the light emitting unit 5 emits pulse light to a predetermined direction (for example, forward from the vehicle V) for a predetermined light emission period tL (for example, 5 ns), according to a pulse signal output from the timing controller 9. The light emission cycle tP of pulse light which is radiated from the light emitting unit 5 is set to, for example, an interval of 10 μs or less.

The objective lens 6 is, for example, an optical system set so as to have such an angle of field that it is possible to image a predetermined range in front of the vehicle V, and receives reflected light from objects. The objective lens 6 may be disposed close to the light emitting unit 5, or may be disposed apart from the light emitting unit.

The light intensifying unit 7 includes a gate 7a and an image intensifier 7b.

The gate 7a is opened and closed according to an opening/closing command signal from the timing controller 9. In one or more embodiments of the present invention, a period (gate period) tG when the gate 7a is opened is set to 5 ns similarly to the light emission period tL. The gate period tG is proportional to the imaging object length (imaging object depth) of each range (target distance range) of an overall imaging range from a range 1 to a range n. As the gate period tG is lengthened, the imaging object length of each range lengthens. The imaging object length is obtained from the product of light speed and the gate period tG, and in one or more embodiments of the present invention, since the gate period tG is set to 5 ns, the imaging object length becomes 1.5 m from the product of light speed (about $3 \times 10^8$ m/s) and the gate period (5 ns).

The image intensifier 7b is a device for first converting very weak light (such as reflected light from objects) into electrons, and electrically amplifying them, and converting them back into a fluorescent image, thereby doubling the amount of light, such that it is possible to see an image with clear contrast. Light amplified by the image intensifier 7b is guided to an image sensor of the high-speed camera 8.

The high-speed camera 8 images the image output from the light intensifying unit 7, according to a command signal from the timing controller 9, and outputs the acquired image to the image processing unit 3. In one or more embodiments of the present invention, a camera having a resolution of 640×480 (transverse: longitudinal), luminance values 1 to 255 (256 levels), and a frame rate of 100 fps or more is used.

The timing controller 9 controls imaging timings by setting a delay time tD (in FIG. 2, $tD_n$, $tD_{n+1}$) which is a time from when the light emitting unit 5 starts to emit light to when the gate 7a is opened such that the timings when images are acquired by the high-speed camera 8 become the timings when reflected light from target distance ranges which are target imaging ranges reach and outputting opening/closing command signals according to the delay time tD. In other words, the delay time tD is a value to determine the distance (imaging object distance) from the vehicle V to the target distance range. The relationship between the delay time tD and the imaging object distance is obtained from the following Expression (1).

$$\text{Imaging Object Distance} = \text{Light Speed (about } 3 \times 10^8 \text{ m/s)} \times \text{Delay Time } tD/2 \quad (1)$$

The timing controller 9 changes the imaging range of the high-speed camera 8 forward from the vehicle 100 by repeatedly lengthening the delay time tD by a predetermined interval (for example, 10 ns) such that the target distance range continuously goes forward (away) from the vehicle V. Also, the timing controller 9 performs control such that the imaging operation of the high-speed camera 8 starts immediately before the gate 7a is opened and the imaging operation finishes after the gate 7a is completely closed.

The timing controller 9 controls the light emitting unit 5, the gate 7a, and the high-speed camera 8 such that they perform a plurality of times of light emission and exposure for each of preset target distance ranges (each range of the range 1, the range 2, . . . , and the range n). Light which the high-speed camera 8 has received is converted into electric charge, and a plurality of times of light emission and exposure is repeated, whereby the electric charge is accumulated. One image which is acquired every predetermined charge accumulation time is called a frame. However, the high-speed camera 8 may acquire one image (one frame) for each target distance range, or may acquire a plurality of images (several frames) for each target distance range. In the above-mentioned way, the high-speed camera 8 acquires a plurality of different images of target distance ranges, and outputs the plurality of acquired images to the image processing unit 3.

The image processing unit 3 generates distance image data representing the distances to objects (subjects) of respective pixels, based on the luminance of the same pixels in images of all imaging ranges acquired by the high-speed camera 8, and outputs the generated distance image data to the object recognition processing unit 4.

The object recognition processing unit 4 specifies objects included in the distance image data. As the object specifying method, a well-known technology such as pattern mapping can be used.

The determination unit 10 determines the relationship (such as distances and directions) between the vehicle (the vehicle V) and the objects (such as persons, vehicles, and signs) specified by the object recognition processing unit 4.

Next, an image acquiring operation according to one or more embodiments of the present invention will be described.

[Image Acquiring Operation]

The timing controller 9 sets the delay time tD such that the timing when an image which is acquired by the high-speed camera 8 becomes the timing when reflected light from predetermined target distance ranges reach, thereby controlling imaging timings of the high-speed camera 8. In the case where there is any object in a target distance range, the time required for light emitted from the light emitting unit 5 to return from the target distance range becomes the time required for the light to travel out and back over the distance (imaging object distance) between the vehicle V and the target distance range. Therefore, the delay time tD can be obtained from the imaging object distance and the light speed.

In an image of the high-speed camera 8 acquired by the above-mentioned method, in the case where there is an object in a target distance range, luminance value data of pixels corresponding to the location of the corresponding object and influenced by the reflected light represent values higher than luminance value data of the other pixels. Therefore, it is possible to obtain the distance to the object existing in the target distance range, based on the luminance value data of the respective pixels.

Figure 3:
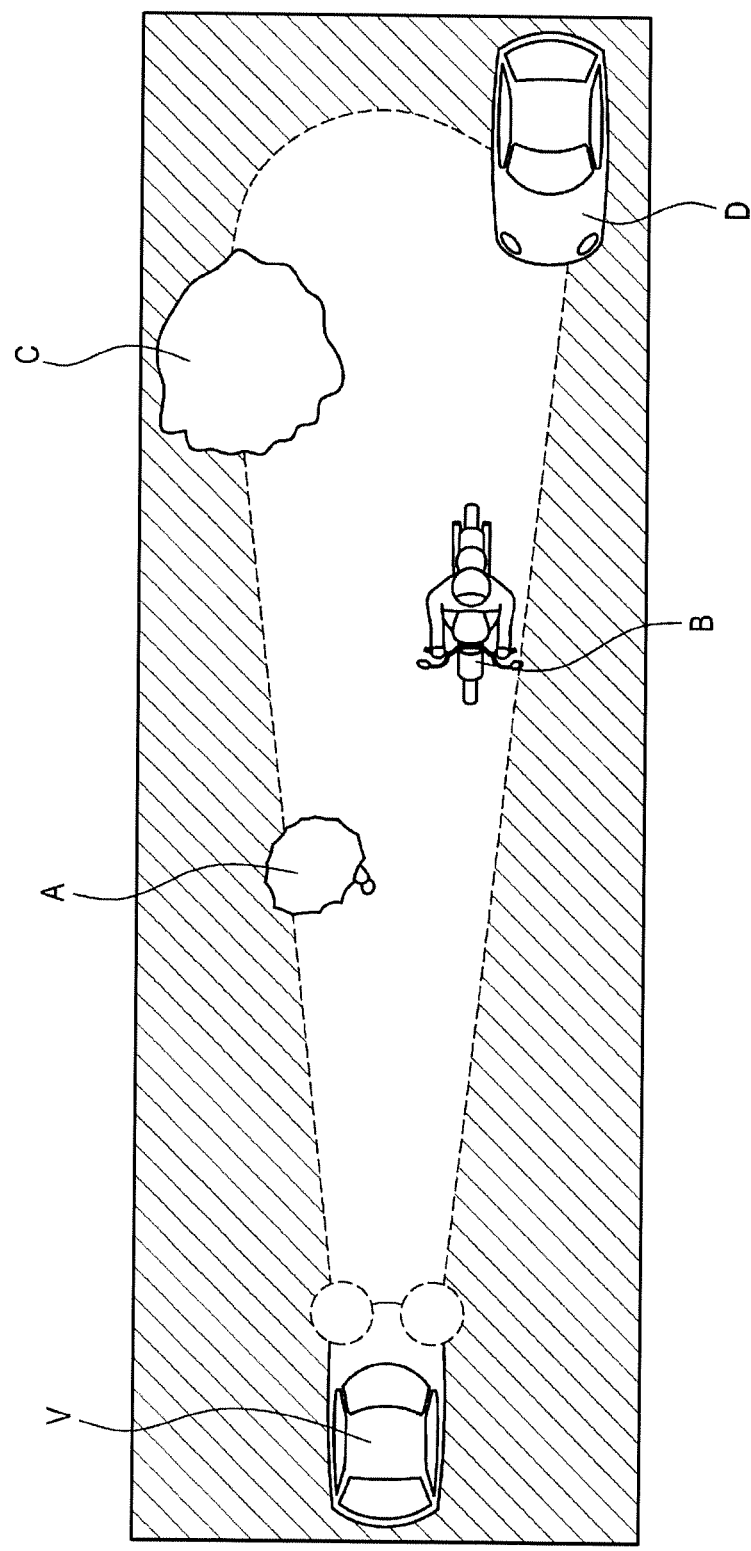
FIG. 3 is a view illustrating a situation where four different objects exist at different positions in front of the own vehicle.

FIG. 3 shows a situation where four objects A to D exist at different locations in front of the vehicle V. The object A is a person holding an umbrella, and the object B is a motorcycle on the oncoming lane side, and the object C is a tree on the sidewalk side, and the object D is a vehicle (an oncoming vehicle) on the oncoming lane side. It is assumed that the relationship of the distances between the vehicle V and the respective objects is A<B<C<D.

Figure 4:
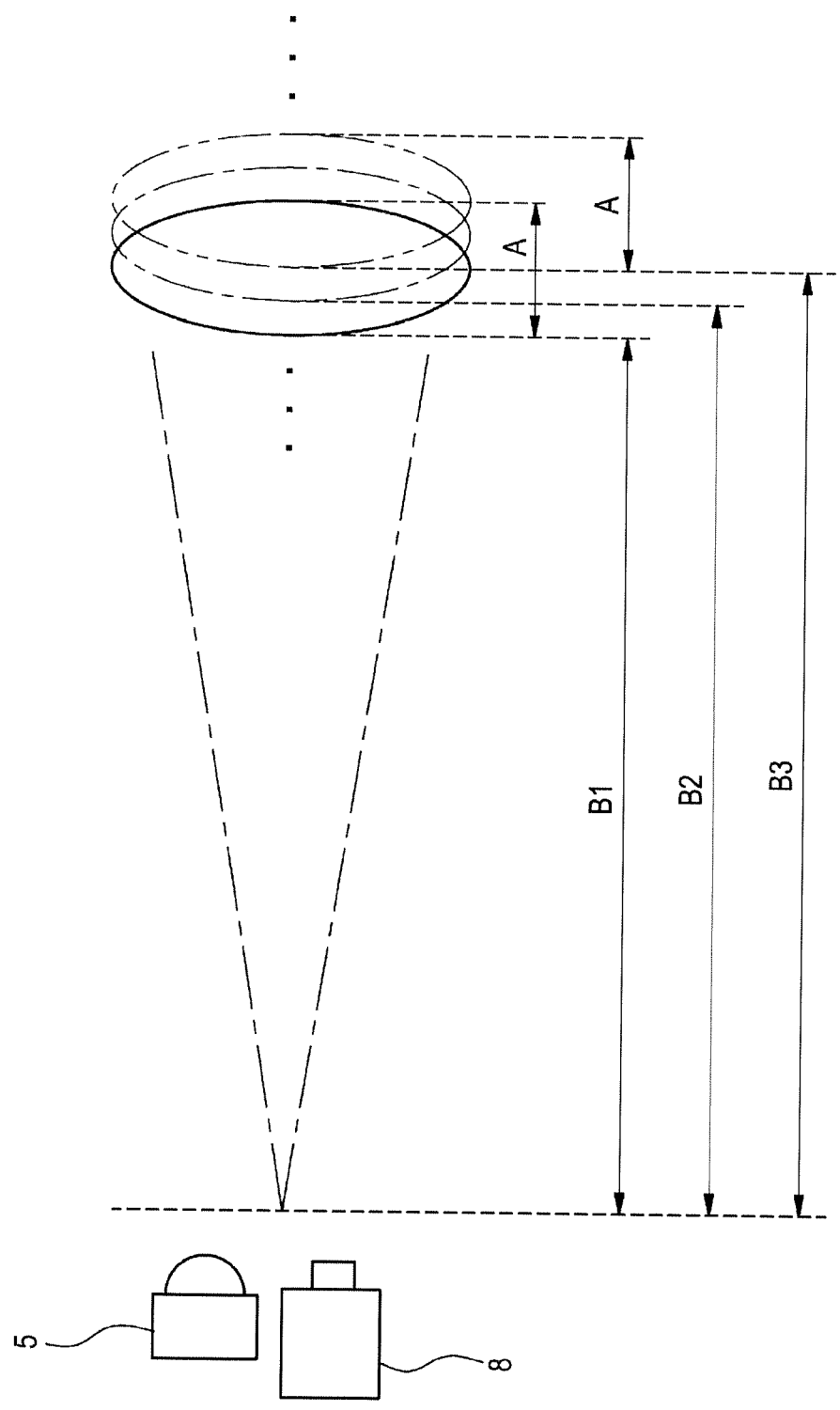
FIG. 4 is a view illustrating a state where imaging ranges partially overlap.

In this case, in one or more embodiments of the present invention, imaging ranges are partially overlapped such that reflected light from one object is reflected in pixels of images of a plurality of continuous imaging ranges. In other words, as shown in FIG. 4, in the case of acquiring images while continuously changing the imaging object distance in the order of B1, B2, B3, . . . , by setting the increment (B2−B1) in the imaging object distance shorter than the imaging object length A of each imaging range, the increment in the imaging object distance is set such that imaging ranges change while partially overlapping.

Figure 5:
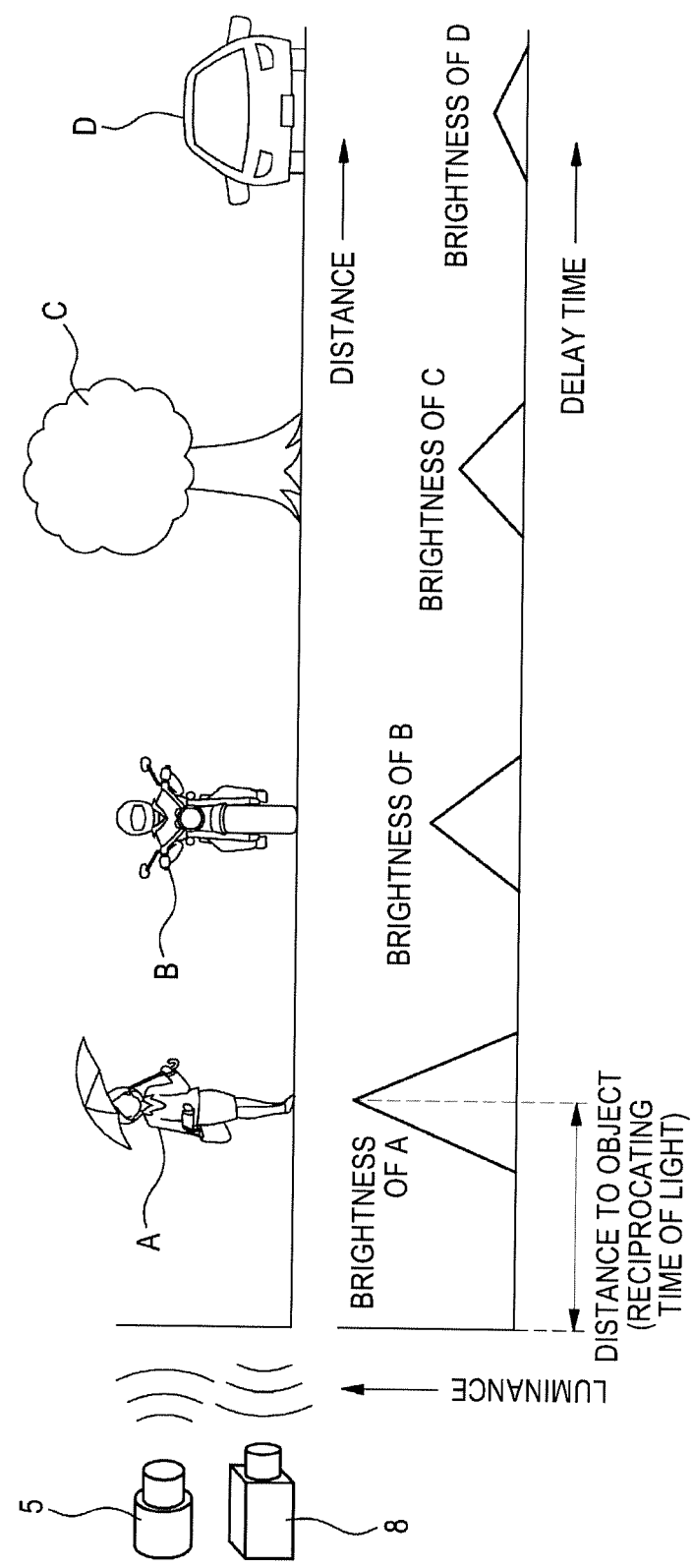
FIG. 5 is a schematic diagram illustrating temporal luminance variations in pixels corresponding to respective objects.

FIG. 5 shows temporal luminance variations in pixels corresponding to the respective objects.

Since the imaging ranges are partially overlapped, as shown in FIG. 5, the luminance values of the same pixels in the plurality of consecutive images represent features having triangular wave shapes in which the luminance values gradually increase and have peaks at the positions of the respective objects A to D and gradually decrease. That is, since the increment is set such that reflected light from one object is reflected in a plurality of images, the temporal luminance variations in the pixels have the triangular wave shapes. Therefore, if imaging ranges corresponding to the peaks of the triangular wave shapes are set at the distances from the vehicle V to the respective objects (subjects) A to D of the corresponding pixels, it is possible to improve detection accuracy.

Also, the obstacle detecting apparatus 1 having the image acquiring apparatus 2 according to one or more of the above-described embodiments can be used for light distribution control of a so-called AHB (automatic high beam) system and an ADB (adaptive driving beam) system. By using the obstacle detecting apparatus 1 together with another camera sensor mounted on the vehicle V, for example, existence or non-existence of objects in front of the vehicle V and the distances to objects are detected from a plurality of different images of target distance ranges acquired by the image acquiring apparatus 2, and an image of an area in front of the vehicle V is acquired by the another camera sensor. It is possible to obtain the distance of each light spot in the image acquired by the camera sensor from the images acquired by the image acquiring apparatus 2, and from the distance, the luminance, shape (the shape of the light spot and the periphery thereof), time-series variation, and so on of each light spot, it is possible to determine whether the light spot corresponds to a vehicle. That is, by using the image acquiring apparatus 2 and another camera sensor together, it is possible to perform detection of distant vehicles with high accuracy at high speed, and it is possible to suitably perform light distribution control of an AHB system or an ADB system.

First Example

FIGS. 6(A)-6(D) are views for explaining the relationship of light-emission periods and exposure periods with distance resolution. FIG. 6(A) shows distance resolution in the case where the pulse width (light emission period) of pulse light and the gate period (exposure period) of the high-speed camera are comparatively short. Meanwhile, FIG. 6(B) shows distance resolution in the case where the pulse width (light emission period) of pulse light and the gate period (exposure period) of the high-speed camera are longer than the pulse width and the gate period of FIG. 6(A), respectively. Also, FIGS. 6(C) and 6(D) show the relationships of the light emission period and the exposure period with imaging object distance.

As described above, imaging object distance L is obtained from [Light Speed]×[Delay Time tD (Time to of FIGS. 6(C) and 6(D))]/2. In other words, a time $tA_1$ from a light emission end time point of pulse light to an exposure start time point corresponds to a distance L1, and a time $tA_2$ from a light emission start time point of pulse light to an exposure end time point corresponds to a distance L2. Therefore, as the light emission period and the exposure period shorten as shown in FIG. 6(A), an imaging object length (L2−L1) shortens as shown in FIG. 6(C), i.e. the distance resolution increases. Meanwhile, it can be seen that as the light emission period and the exposure period lengthen as shown in FIG. 6(B), the imaging object length (L2-L1) lengthens as shown in FIG. 6(D), i.e. the distance resolution decreases. Therefore, by setting finer target distance resolution as the light emission period and the exposure period shorten, it is possible to improve the accuracy of distance detection.

Figure 7:
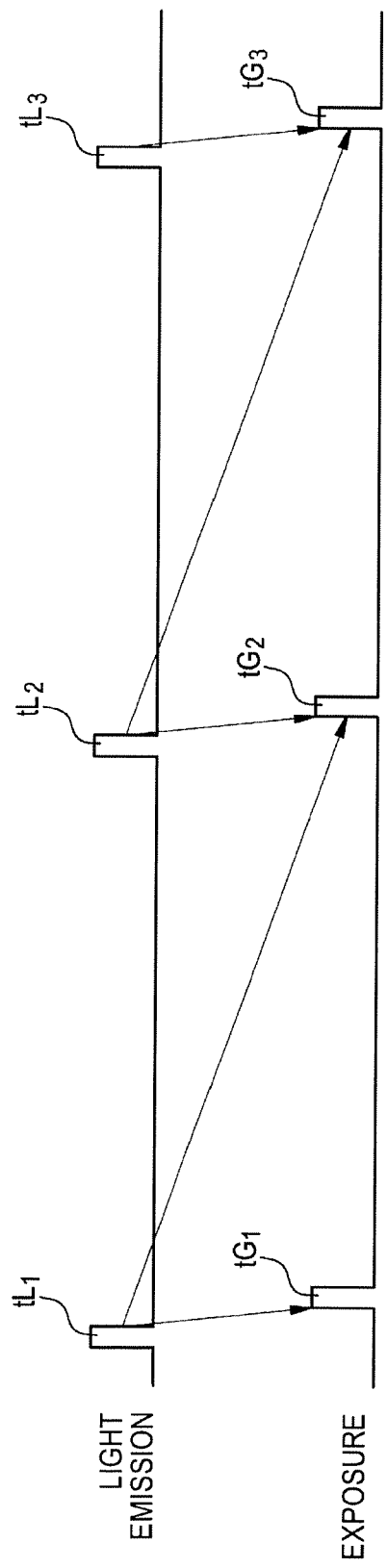
FIG. 7 is a view for explaining the case where a short light emission interval time is set.

FIG. 7 is a view for explaining the case where a short light emission interval time is set. In FIG. 7, first light emission $tL_1$, second light emission $tL_2$, third light emission $tL_3$, and first exposure $tG_1$, second exposure $tG_2$, and third exposure $tG_3$ in which exposure is performed using reflected light caused by the first light emission $tL_1$ to the third light emission $tL_3$ are shown.

Incidentally, in order to acquire as bright a frame as possible (with high luminance), it is desired to repeat light emission and exposure many times. To this end, it can be considered to minimize the light emission cycle tP of pulse light shown in FIG. 2 (and the imaging cycle depending on the emission cycle). However, if the light emission cycle (light emission interval time) tP of pulse light is too short, as shown in FIG. 7, reflected light caused by the first light emission $tL_1$ is received not only during the first exposure $tG_1$ but also the second exposure $tG_2$. Similarly, reflected light caused by the second light emission $tL_2$ is received not only during the second exposure $tG_2$ but also the third exposure $tG_3$. In other words, if the light emission interval time tP is too short, not only reflected light caused by light emission to a desired target distance but also reflected light caused by light emission to a target distance immediately before the desired target distance may be imaged. Therefore, an unnecessary image of a target distance may be acquired.

For this reason, from a comprehensive perspective on the above-described circumstances, the inventors of this application have found that if the light emission interval time tP is suitably set based on the light emission interval time and the delay time tD, it is possible to prevent an unnecessary image of a target distance range from being acquired. Hereinafter, that method will be described in detail.

Figure 8:
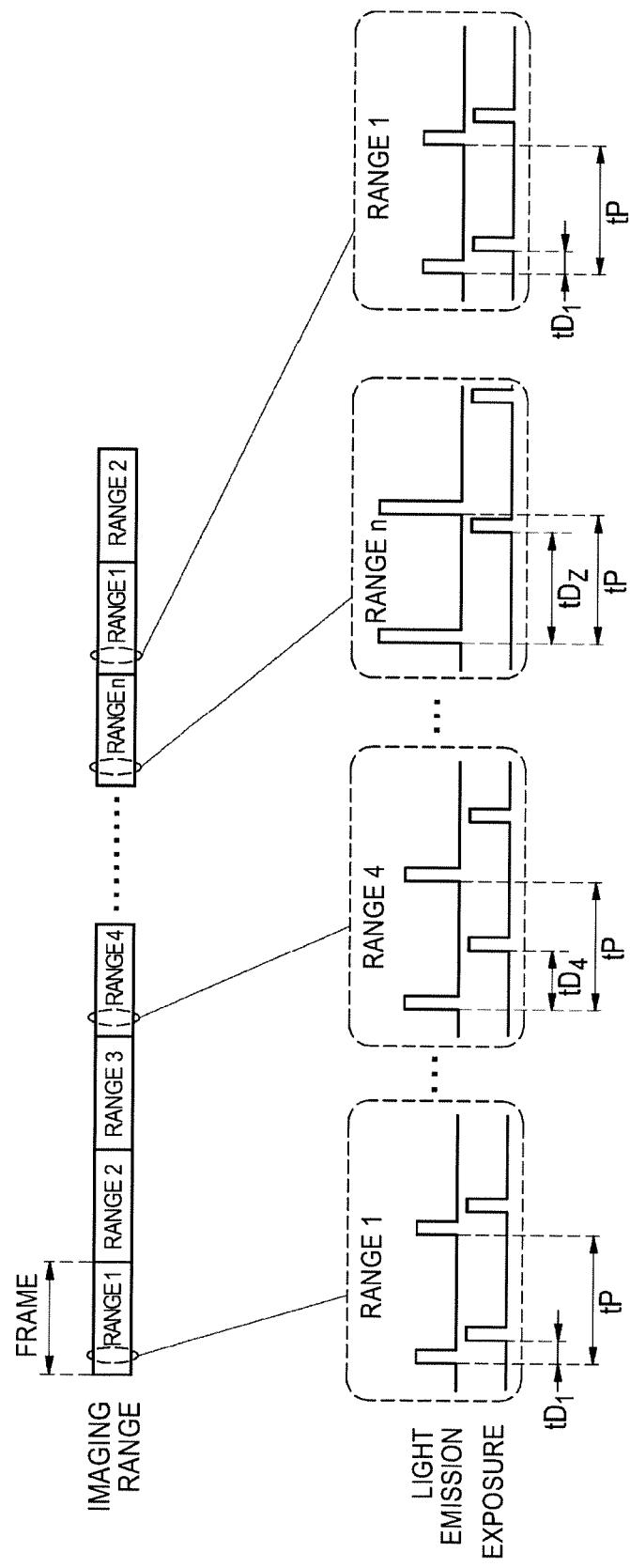
FIG. 8 is a timing chart illustrating a light emission interval time and imaging timings according to a first example.

FIG. 8 is a timing chart illustrating a light emission interval time and imaging timings according to a first example.

In the first example, as shown in FIG. 8, as the imaging object distance increases from a range 1 to a range n, delay times $tD_1$ to $tD_z$ gradually lengthen. In this case, the timing controller 9 sets the light emission cycle tP such that the light emission cycle tP is longer than the maximum delay time $tD_z$ required to image the range n which is the longest-distance range of target distance ranges from which the reflected light can be imaged. For example, in the case where the target distance ranges are in a range from 0 m to 200 m in front of the vehicle V, the light emission cycle tP is set so as to be longer than the maximum delay time $tD_z$ required to image a range at 200 m away from the vehicle V.

The maximum delay time $tD_z$ is determined from the light emission intensity of pulse light to be emitted from the light emitting unit 5, the diffusion angle of the pulse light, and the sensibility of the high-speed camera 8 (an image sensor included therein). Pulse light from light emitting unit 5 is diffused forward from the light emitting unit 5 at a predetermined horizontal angle and a predetermined vertical angle, and thus attenuates with the square of the distance from the light emitting unit 5 or more. Also, the high-speed camera 8 has an image sensor (an imaging device) such as a CCD (Charged Coupled Device) sensor or a CMOS (Complementary Metal Oxide Semiconductor) sensor. The image sensor accumulates electric charge caused by light received by each exposing operation, and converts the electric charge into an electrical signal, and outputs the electrical signal to an image processing unit 10. From the attenuation of pulse light according to the distance from the vehicle V, and the sensitivity of the image sensor of the high-speed camera 8, it is possible to calculate a distance from which reflected light cannot be received to accumulate electric charge in the image sensor. In the present example, the flight time of pulse light to the distance from which reflected light cannot be received to accumulate electric charge, calculated as described above, is set as the maximum delay time $tD_z$.

Incidentally, the image acquiring apparatus 2 described above divides target distance ranges into a plurality of imaging ranges 1 to n, and acquires images of the respective imaging ranges 1 to n while changing the delay time from the delay time $tD_1$ to the delay time $tD_z$. In this case, as the distances of the imaging ranges from the vehicle V increase, the amount of reflected light gradually decreases. Therefore, images of objects of far ranges are darker than images of objects of near ranges.

For this reason, in the first example, in a state where the light emission cycle tP is set to be longer than the maximum delay time $tD_z$, emission of pulse light from the light emitting unit 5 is controlled such that the light emission intensity of pulse light to image a far range of the target distance ranges is higher than the light emission intensity to image a near range of the target distance range (see FIG. 8). Therefore, as the distances to the target distance ranges increase, the light emission intensity gradually increases. Therefore, it is possible to make the amount of reflected light uniform when imaging the respective ranges. According to one or more embodiments of the present invention, the light emission intensity of pulse light can be linearly changed such that the light emission intensity gradually increases as the imaging object distance from the vehicle V increases. Also, in the case where the target distance ranges are in a range from 0 m to 200 m in front of the vehicle V, the light emission interval time tP is set to be longer than the maximum delay time $tD_z$ required to image a range at 200 m away from the vehicle V. Therefore, if the light emission intensity of pulse light is too high, when exposure is performed once, besides reflected light caused by light emission performed immediately before the exposure, reflected light caused by light emission performed immediately before the previous exposure may be imaged. For this reason, it is desired that pulse light be radiated with such light emission intensity that only reflected light which is caused by light emission performed immediately before exposure can be imaged. For example, in order to image a short-distance range (for example, about 10 m from the vehicle V), the light emission intensity of pulse light to be emitted from the light emitting unit 5 is set such that a range at 210 m away from the vehicle V cannot be imaged. Also, in order to image a longest-distance range (for example, about 190 m from the vehicle V), the light emission intensity of pulse light to be emitted from the light emitting unit 5 is set higher than the light emission intensity to image short-distance ranges such that a range at 390 m away from the vehicle V cannot be imaged.

According to the image acquiring apparatus 2 of one or more of the embodiments described above, one or more of the following effects are obtained.

(1) The timing controller 9 sets the light emission interval time tP such that the light emission interval time tP is longer than the maximum delay time $tD_z$ required to image the longest-distance range (for example, the range n of FIG. 9) of the target distance ranges from which the reflected light cannot be imaged. According to this configuration, only reflected light caused by light emission to a desired target distance is imaged without imaging reflected light caused by light emission to a target distance immediately before the desired target distance, and it is possible to prevent an unnecessary image of a target distance range from being acquired. As a result, it is possible to suppress noise from being mixed, and it becomes possible to acquire more accurate distance information.

(2) According to one or more embodiments of the present invention, the maximum delay time $tD_z$ is determined from the light emission intensity and diffusion angle of pulse light and the sensitivity of the image sensor of the high-speed camera 8. Since the above-mentioned parameters are used in calculating the maximum delay time $tD_z$, it is possible to easily calculate the maximum delay time $tD_z$.

(3) According to one or more embodiments of the present invention, the light emitting unit 5 is configured to decrease the light emission intensity of pulse light in order to image a short-distance range of target distance ranges and increase the light emission intensity of pulse light in order to image a long-distance range of the target distance ranges. According to this configuration, it is possible to make the amount of reflected light uniform when imaging respective target distance ranges, and it is possible to decrease the luminance difference between pixels in images of respective ranges, corresponding to the positions of objects. As a result, it is possible to prevent images of long-distance ranges from becoming darker as compared to short-distance ranges.

Second Example

Next, a second example will be described with reference to FIG. 9 and FIG. 10.

Figure 9:
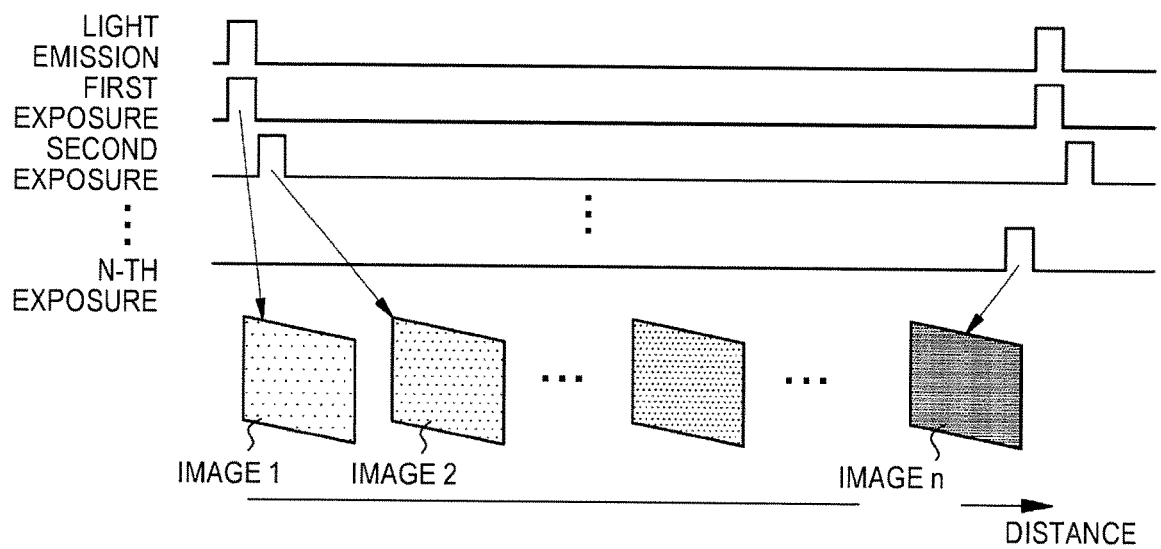
FIG. 9 is a view illustrating a light emission cycle, imaging timings, and images according to a second example.

FIG. 9 is a view illustrating a light emission cycle, imaging timings, and images according to the second example. FIG. 10 is a graph illustrating the relationship between image brightness which varies according to the density of fog and the distance from the vehicle, according to the second example.

As described above, the imaging object distance L is obtained from [Light Speed]×[Delay Time tD]/2. Therefore, by gradually changing the delay time tD, it is possible to acquire images according to different imaging object distances. In the second example, the image processing unit 3 acquires a plurality of images 1 to n at different imaging timings (first exposure to n-th exposure), as shown in FIG. 9, and determines the degree of darkness of each of the acquired images 1 to n (the darkness of each image). Also, the images 1 to n are images in which darkness gradually increases (i.e. brightness (luminance) gradually decreases) as the distance from the vehicle V increases.

The degree of darkness of each of the images 1 to n is determined as follows.

Figure 10:
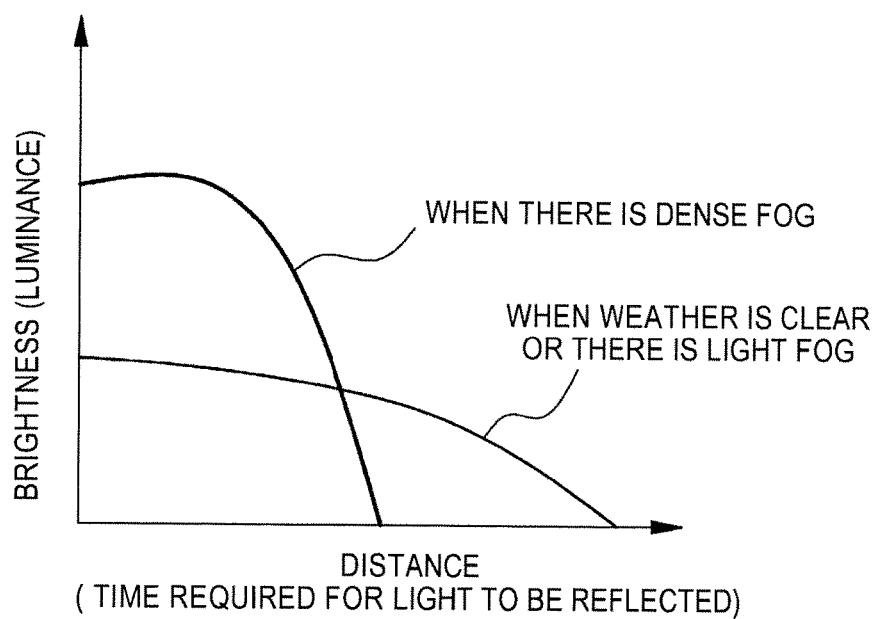
FIG. 10 is a graph illustrating the relationship between image brightness which varies according to the density of fog and the distance from the vehicle.

As shown in FIG. 10, in the case where weather is clear or there is a light fog, as the distance from the vehicle V increases (i.e. the time required for the pulse light to be reflected lengthens), the amount of reflected light gradually deceases, and the brightness (luminance) of images becomes low, i.e. images become darker gradually as shown in FIG. 9. Meanwhile, in the case where there is a dense fog, from a certain distance from the vehicle V, drastically, the amount of reflected light decreases and the brightness of images deceases (the degree of darkness drastically increases). From this relationship between the depth of fog and variation in image brightness, it is possible to obtain the distance of vision from the vehicle V, using a plurality of images acquired by the high-speed camera 8.

Hereinafter, a method of calculating the distance of vision from the vehicle V will be described.

The image processing unit 3 determines the degree of darkness of each image, for example, by setting a threshold for the luminance values of a plurality of acquired images. In this case, for example, the image processing unit 3 compares the actual luminance value of an image according to each of distances from the vehicle V with the largest luminance value (maximum brightness) of the image of the corresponding distance. The largest luminance value is, for example, the largest luminance value which can be predicted in the case where weather is clear without fog. In the case where the actual luminance value of an image is equal to or lower than, for example, 50% of the largest luminance value, the image processing unit 3 determines that a distance corresponding to the image is a distance which cannot be visually recognized from the vehicle V. The image processing unit 3 acquires visibility information including the distance which cannot be visually recognized, and transmits the visibility information to the integrated control unit 100 (FIG. 1) to control driving of the vehicle V. However, the high-speed camera 8 which is an image acquisition unit may be configured to acquire visibility information from a plurality of images, and transmit the visibility information directly to the integrated control unit 100, not via the image processing unit 3.

The integrated control unit 100 can calculate the speed limit of the vehicle V based on the visibility information received from the image processing unit 3, and perform control on the running speed based on the calculated speed limit. Also, the integrated control unit 100 may notify the speed limit as a safe speed to the driver of the vehicle V.

According to the image acquiring apparatus 2 and the integrated control unit 100 of one or more of the embodiments described above, one or more of the following effects are obtained.

(4) The image processing unit 3 (or the high-speed camera 8) acquires visibility information by determining the degree of darkness of each target distance range from a plurality of images acquired by the high-speed camera 8 and determining an invisible target distance range which cannot be visually recognized. According to this configuration, it is possible to acquire visibility information in a bad weather, particularly, information on the depth of fog when there is a fog.

(5) According to one or more embodiments of the present invention, the degree of image darkness is determined by setting a threshold for image luminance. According to this configuration, it is possible to determine the depth of fog by an easy method.

(6) According to one or more embodiments of the present invention, the image processing unit 3 (or the high-speed camera 8) is configured to transmit visibility information to the integrated control unit 100 to control driving of the vehicle V. According to this configuration, it is possible to use visibility information acquired in a bad weather such as in foggy weather to control driving of the vehicle V.

(7) The integrated control unit 100 performs control on the running speed of the vehicle V or notifies the driver, based on visibility information received from the image processing unit 3 (or the high-speed camera 8). According to this configuration, it is possible to use visibility information acquired in a bad weather such as in foggy weather, for safe running, automated driving, and the like of the vehicle V.

Third Example

Next, a third example will be described with reference to FIG. 11 to FIG. 14(C).

Figure 11:
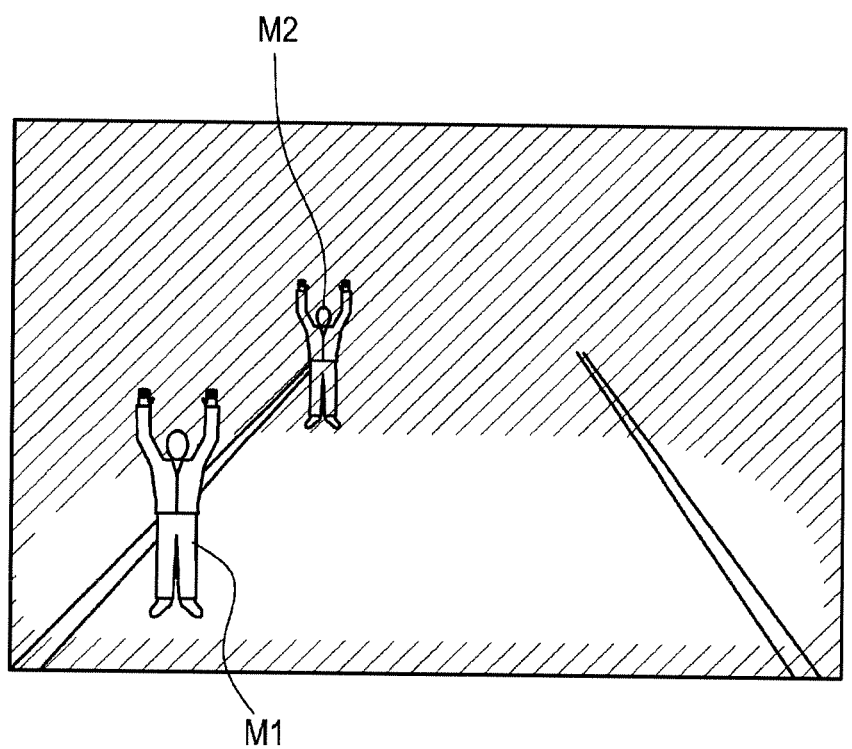
FIG. 11 is an image diagram of an image according to a conventional example, acquired when irradiating an area in front of a vehicle.

FIG. 11 is an image diagram of an image according to a conventional example, acquired when irradiating an area in front of the vehicle. As shown in FIG. 11, a person M1 is standing in a near range in front of the vehicle, and a person M2 is standing in a far range. In this state, as in the conventional art, for example, in the case of performing imaging using night illumination light by a camera mounted on the vehicle, since the amount of reflected light from the near range from the vehicle is large, in the image acquired by the camera mounted on the vehicle, the image of the person M1 has high luminance and is bright. Meanwhile, since the amount of reflected light from the far range from the vehicle is small, the image of the person M2 in the far range has low luminance and is dark. In other words, between the near object and the far object, the luminance difference is large and the contrast is high. Therefore, the visibility of the object in the far range is inferior.

For this reason, from a comprehensive perspective on the above-described circumstances, the inventors of this application have found a method of performing imaging such that an image of a near range from the vehicle V and an image of a far range from the vehicle become equivalent in pixel luminance, thereby decreasing the contrast difference and improving visibility of objects in the far range. Hereinafter, a method of acquiring images of a near range and a far range from the vehicle V equivalent in contrast will be described in detail.

Figure 12:
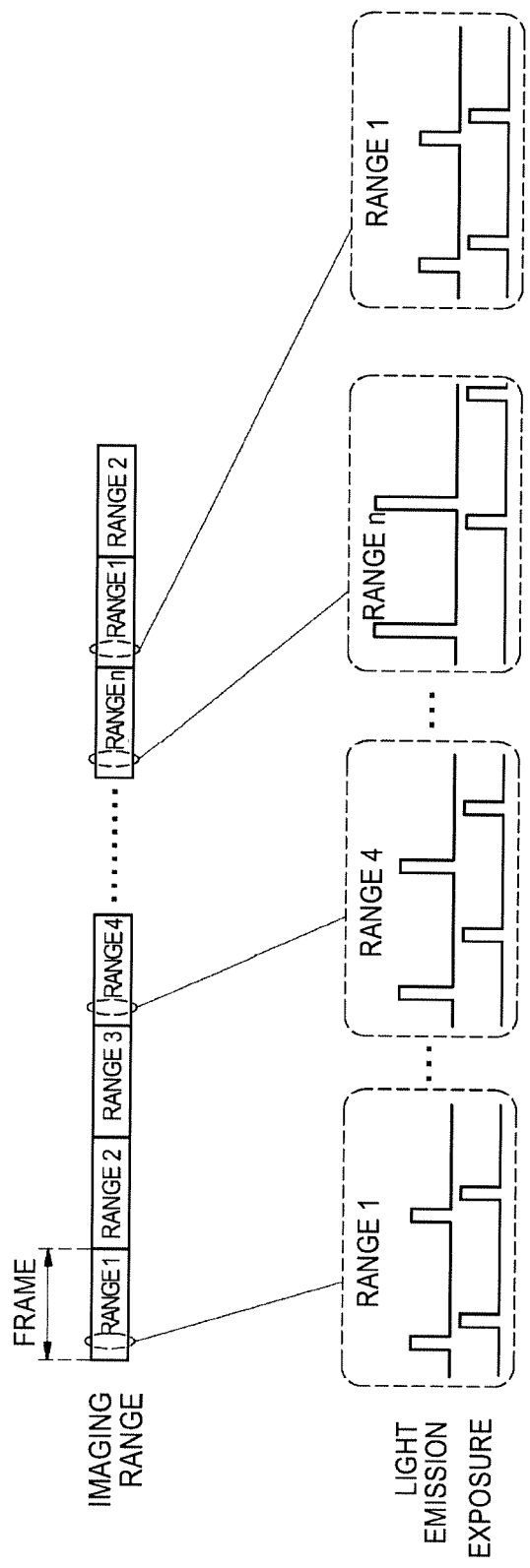
FIG. 12 is a timing chart of a light emission cycle and an imaging cycle according to a third example, and is a view particularly illustrating an example in which light emission intensity varies.

FIG. 12 is a timing chart of a light emission cycle and an imaging cycle according to the third example, and is a view particularly illustrating an example in which the light emission intensity varies.

In the third example, the light emitting unit 5 is controlled such that the light emission intensity of pulse light to image a far range of target distance ranges is higher than the light emission intensity to image a near range of the target distance ranges. Specifically, the light emission intensity of pulse light can be linearly changed such that the light emission intensity gradually increases as the imaging object distance from the vehicle V increases. The light emission intensity for the range 1 (a range at about 10 m from the vehicle V) is, for example, 100 lm (lumens), and the light emission intensity for the range n (a range at about 100 m from the vehicle V) is, for example, 1000 lm (lumens). As described above, the light emission intensity is gradually increased depending on the distances of target distance ranges (imaging object distances). Therefore, the luminance difference between pixels in images of respective ranges, corresponding to the positions of objects, decreases.

Figure 13:
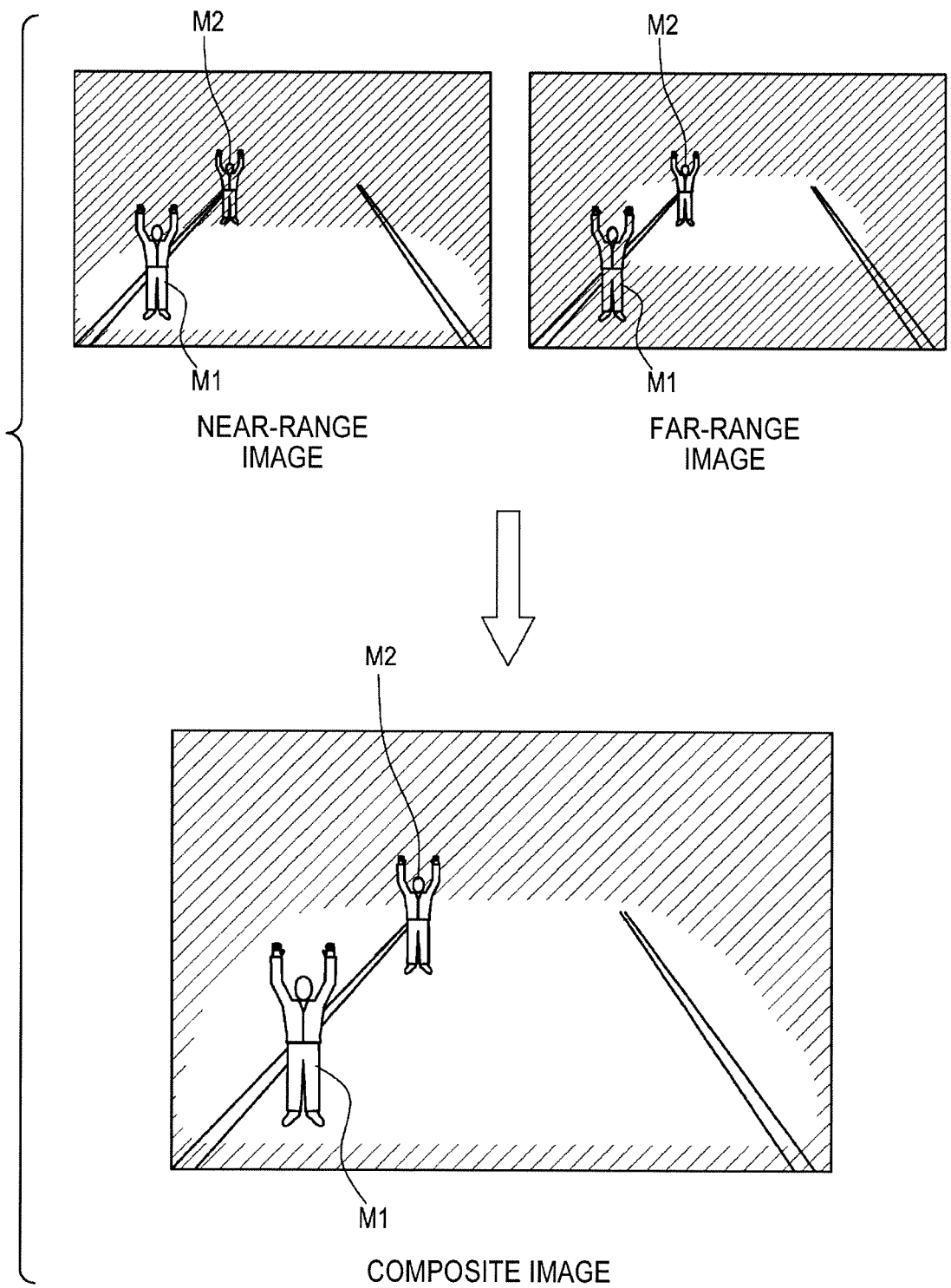
FIG. 13 is an image diagram of a near-range image and a far-range image, and a composite image of the near-range image and the far-range image according to the third example.

FIG. 13 is an image diagram illustrating a near-range image and a far-range image, and a composite image of the near-range image and the far-range image, according to the third example.

For example, as shown in FIG. 13, in a near-range image which is acquired by imaging a near range, similarly to the conventional example shown in FIG. 11, since the amount of reflected light from the near range is large, the image of the person M1 in the near range is bright (in this case, reflected light from the person M2 in the far range is not imaged). Also, in a far-range image which is acquired by imaging a far range, since pulse light with light emission intensity higher than that for the near range is radiated, the amount of reflected light from the person M2 is larger than that in the conventional example shown in FIG. 11. As a result, the image of the person M2 is also bright similarly to the image of the person M1 in the near-range image (in this case, the reflected light from the person M1 in the near range is not imaged). After the near-range image and the far-range image are acquired by imaging the reflected light of the pulse light while gradually increasing the light emission intensity according to the imaging object distances as described above, the image processing unit 3 combines them to generate a composite image (distance image data) shown in FIG. 13. In the composite image, the person M1 in the near range and the person M2 in the far range have substantially the same luminance.

According to the image acquiring apparatus 2 of one or more of the embodiments described above, one or more of the following effects are obtained.

(8) The light emitting unit 5 is controlled such that the light emission intensity of pulse light to image a far range of target distance ranges is higher than the light intensity to image a near range. Therefore, it is possible to acquire distance image data (a composite image) in which the luminance difference between pixels of objects in the near range and pixels of objects in the far range is small.

Therefore, it is possible to acquire images of a near range and a far range equivalent in contrast, and it is possible to acquire appropriate images.

(9) According to one or more embodiments of the present invention, the light emission intensity of pulse light can be linearly changed according to the distances of target distance ranges. According to this configuration, it is possible to acquire images uniform in contrast over the entire range of the target distance ranges.

Figure 14A:
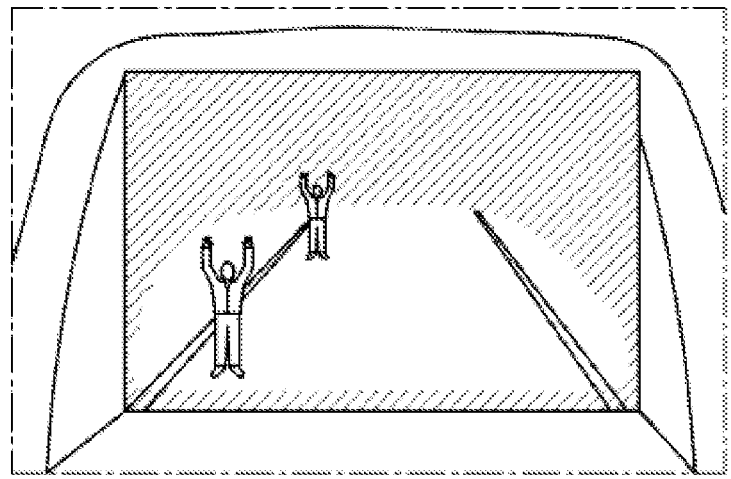
FIGS. 14(A)-14(C) are views illustrating an example in which the composite image according to the third example is applied.
Figure 14B:
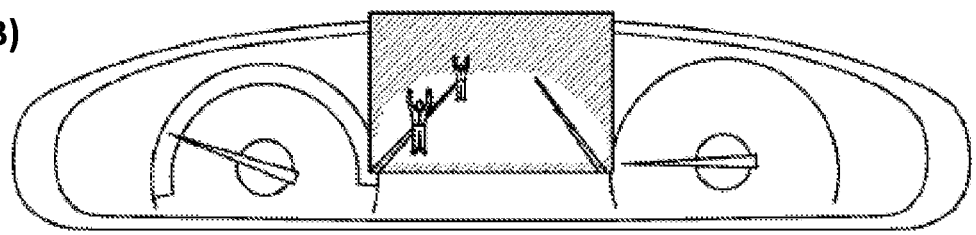
Figure 14C:
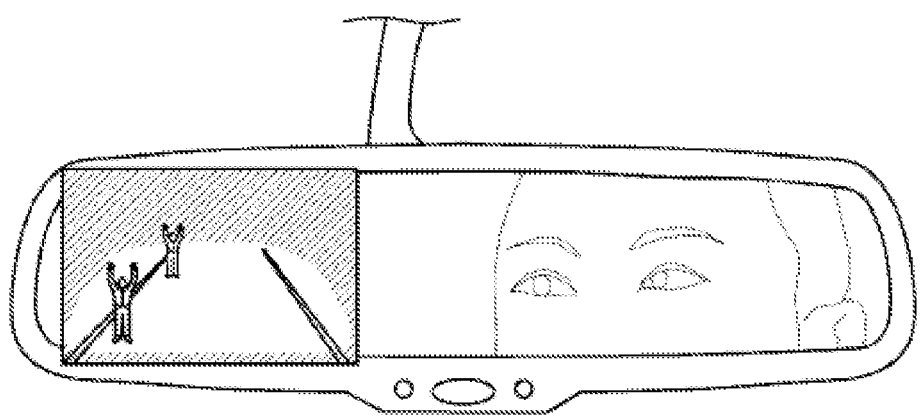

Also, it is possible to display the composite image of FIG. 13 generated in the above-mentioned way, on various devices installed in the vehicle V. For example, as shown in FIGS. 14(A) to 14(C), it is possible to display the composite image at such a position that the driver of the vehicle V can easily and visually recognize the image, for example, on a display unit of the car navigation system, a display unit on the meter panel, or on a display unit mounted on a part of the rearview mirror, to contribute to improvement in safety at night or in a bad weather such as in rainy weather.

Fourth Example

Next, a fourth example will be described with reference to FIG. 15.

Figure 15:
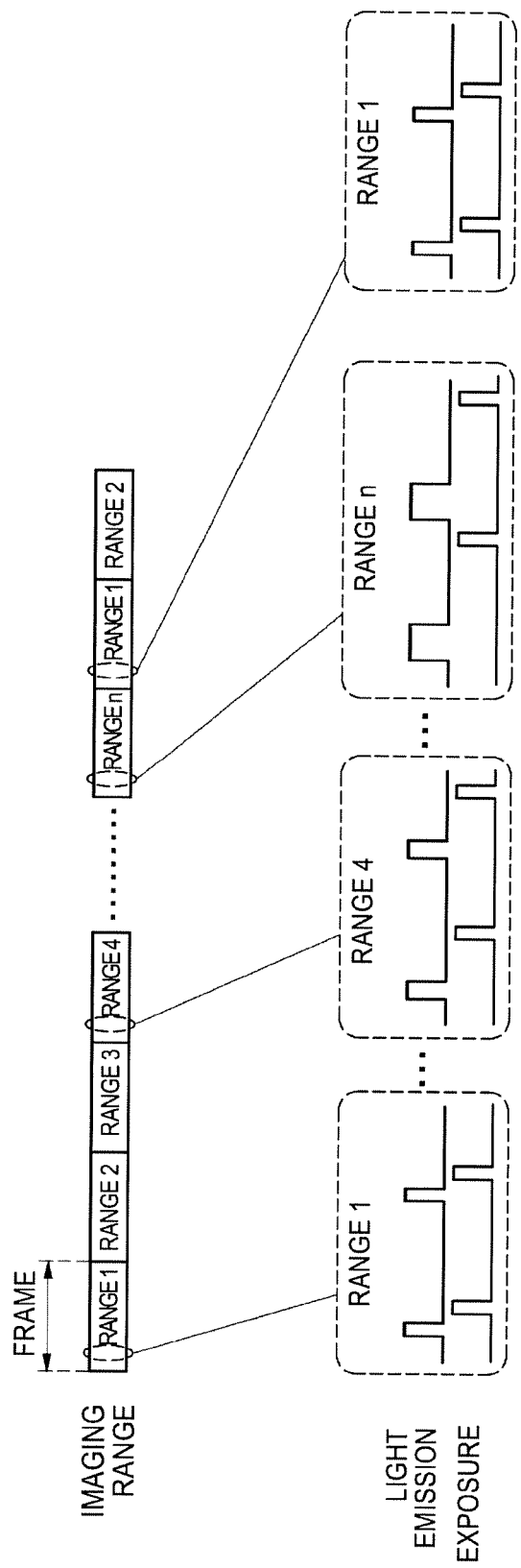
FIG. 15 is a timing chart of a light emission cycle and an imaging cycle according to a fourth example, and is a view particularly illustrating an example in which the light emission period varies.

FIG. 15 is a timing chart of a light emission cycle and an imaging cycle according to the fourth example, and is a view particularly illustrating in an example in which the light emission period varies. In the fourth example, the light emitting unit 5 is controlled such that the light emission period of pulse light to image a far range of target distance ranges is longer than the light emission period to image a near range of the target distance ranges. Specifically, the light emission period of pulse light can be linearly changed such that the light emission period gradually lengthens as the imaging object distances from the vehicle V increase. For example, the light emission period (a period tL of FIG. 2) for the range 1 (a range at about 10 m from the vehicle V) is 10 µs, and the light emission period for the range n (a range at about 100 m from the vehicle V) is 20 µs.

As described above, the light emission period is gradually lengthened according to the distances of the target distance ranges. Therefore, the luminance difference between pixels in images of respective ranges, corresponding to the positions of objects, decreases. Similarly to the third example, the image processing unit 3 combines a near-range image and a far-range image acquired by performing imaging while changing the light emission period, to generate a composite image. Therefore, even in the fourth example, it is possible to acquire composite images uniform in contrast in which the luminance difference between pixels of objects in near ranges and pixels of objects in far ranges is small.

Fifth Example

Next, a fifth example will be described with reference to FIG. 16.

Figure 16:
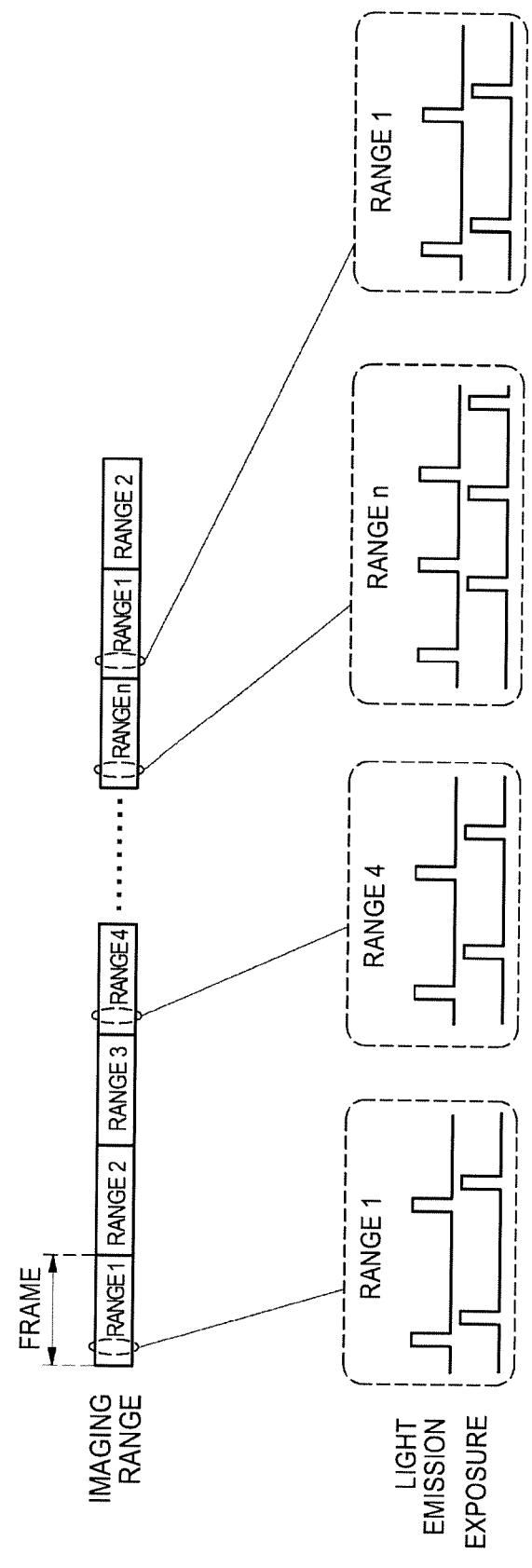
FIG. 16 is a timing chart of a light emission cycle and an imaging cycle according to a fifth example, and is a view particularly illustrating an example in which the number of times of light emission and the number of times of imaging vary.

FIG. 16 is a timing chart of a light emission cycle and an imaging cycle according to the fifth example, and is a view particularly illustrating an example in which the number of times of light emission and the number of times of imaging vary.

In the fifth example, the light emitting unit 5 is controlled such that the number of times of light emission of pulse light to image a far range of target distance ranges is larger than the number of times of light emission to image a near range of the target distance ranges, and is controlled such that according to the number of times of light emission, the number of times the gate 7a is opened (the number of times of imaging) to image a far range is larger than the number of times the gate is opened to image a near range. Specifically, the number of times of light emission of pulse light and the number of times of imaging can be linearly changed such that they gradually increase as the imaging object distances from the vehicle V increase. The number of times of light emission and the number of times of imaging per frame for the range 1 (a range at about 10 m from the vehicle V) are, for example, 100, and the number of times of light emission and the number of times of imaging per frame for the range n (a range at about 100 m from the vehicle V) are, for example, 10000.

As described above, as the distances of target distance ranges increase, the number of times of light emission and the number of times of imaging are gradually increased. As a result, the amount of electric charge which is accumulated with respect to each range increases. Therefore, the luminance difference between pixels in images of respective ranges, corresponding to the positions of objects, decreases. Similarly to the third example, if a near-range image and a far-range image are acquired by performing imaging while changing the number of times of light emission and the number of times of imaging, the image processing unit 3 combines them to generate a composite image. Therefore, even in the fifth example, it is possible to acquire composite images uniform in contrast in which the luminance difference between pixels of objects in near ranges and pixels of objects in far ranges is small.

Although first to fifth examples are described herein, the specific configurations are not limited to the configurations of the examples, and design change, addition, and so on are allowed unless they depart the gist of the inventions according to claims.

For example, the imaging object length, the amount of change in the imaging object distance, the number of frames for each target distance range, and so on can be appropriately set according to the performance of the high-speed camera 8 and the image processing unit 3.

In one or more of the above-described embodiments, as shown in FIG. 1, the high-speed camera 8 functions as an image acquisition unit; however, this disclosure is not limited to this example. For example, the image processing unit 3 may have the function of an image acquisition unit, or a separate memory for storing images may be provided as an image acquisition unit between the high-speed camera 8 and the image processing unit 3.

In one or more of the above-described embodiments, as shown in FIG. 1, the light intensifying unit 7 (the gate 7a and the image intensifier 7b) is installed between the objective lens 6 and the high-speed camera 8; however, this disclosure is not limited to this example. For example, without installing the light intensifying unit 7, it is possible to acquire a plurality of images by performing gating in the high-speed camera 8 at predetermined imaging timings.

In one or more of the above-described embodiments, object recognition is performed by generating distance image data by the image processing unit 3; however, object recognition may be performed from images of respective target distances acquired by the high-speed camera 8.

In the second example described above, information on the depth of fog is acquired as visibility information; however, visibility information on a bad weather such as rainy weather and snowy weather besides foggy weather may be acquired.

In the third to fifth examples described above, the configurations for generating distance image data by separately changing the light emission intensity of pulse light, the light emission period, and the number of times of light emission have been taken as examples; however, a combination of at least two of the light emission intensity of pulse light, the light emission period, and the number of times of light emission may be changed according to the imaging object distances. If parameters to be changed are combined, it is possible to more efficiently generate composite images equivalent in contrast between parts corresponding to far ranges and parts corresponding to near ranges.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An image acquiring apparatus for a vehicle comprising:
    a light emitting unit configured to emit light pulses in a predetermined direction;
    an image acquisition unit configured to acquire a plurality of images from a plurality of target distance ranges by imaging reflected light returning from the plurality of target distance ranges at imaging timings set according to the target distance ranges; and
    a timing controller configured to control emission timings of the light pulses and the imaging timings,
    wherein the timing controller is configured to, for a first target distance range of the plurality of target distance ranges:
        control the light emitting unit to emit a plurality of first light pulses at a first light emission cycle rate, the plurality of first light pulses each having a first light emission period; and
        control the image acquisition unit to acquire a plurality of first images during a plurality of first gate periods each following a corresponding one of the plurality of first light pulses;
        wherein a gate opening time of each of the plurality of first gate periods follows a pulse emission starting time of the corresponding one of the plurality of first light pulses by a first delay time;
    wherein the timing controller is configured to, for a second target distance range of the plurality of target distance ranges:
        control the light emitting unit to emit a plurality of second light pulses at a second light emission cycle rate, the plurality of second light pulses each having a second light emission period; and
        control the image acquisition unit to acquire a plurality of second images during a plurality of second gate periods each following a corresponding one of the plurality of second light pulses;
        wherein a gate opening time of each of the plurality of second gate periods follows a pulse emission starting time of the corresponding one of the plurality of second light pulses by a second delay time;
    wherein the second delay time is longer than the first delay time and the second target distance range is more distant than the first target distance range; and
    wherein the timing controller sets the first light emission cycle and the second light emission cycle to be greater than a longest-distance delay time, the longest-distance delay time being a time from a longest-distance pulse emission starting time to a longest-distance gate opening time of a longest-distance range of the plurality of target distance ranges.

2. The image acquiring apparatus according to claim 1, wherein the longest-distance delay time is determined from a light emission intensity and a diffusion angle of the light pulses and a sensitivity of the image acquisition unit.

3. The image acquiring apparatus according to claim 2, wherein the light emitting unit is configured to decrease the light emission intensity to image the first target distance range and increase the light emission intensity to image the second target distance, range.

4. A vehicle comprising:
    the image acquiring apparatus according to claim 1.

5. The image acquiring device according to claim 1, wherein the light emitting unit is configured to emit the first light pulses with such light emission intensity that reflected light caused by the first light pulses is not imaged during the second gate periods.

6. A control device for controlling an image acquiring apparatus for a vehicle,
    wherein the vehicle comprises:
        a light emitting unit configured to emit light pulses in a predetermined direction; and
        an image acquisition unit configured to acquire a plurality of images from a plurality of target distance ranges by imaging reflected light returning from the plurality of the target distance ranges at imaging timings set according to the target distance ranges,
    wherein the control device comprises:
    a controller configured to control emission timings of the light pulses and the imaging timings,
    wherein the timing controller is configured to, for a first target distance range of the plurality of target distance ranges:
        control the light emitting unit to emit a plurality of first light pulses at a first light emission cycle rate, the plurality of first light pulses each having a first light emission period; and
        control the image acquisition unit to acquire a plurality of first images during a plurality of first gate periods each following a corresponding one of the plurality of first light pulses;
        wherein a gate opening time of each of the plurality of first gate periods follows a pulse emission starting time of the corresponding one of the plurality of first light pulses by a first delay time;
    wherein the timing controller is configured to, for a second target distance range of the plurality of target distance ranges:
        control the light emitting unit to emit a plurality of second light pulses at a second light emission cycle rate, the plurality of second light pulses each having a second light emission period; and
        control the image acquisition unit to acquire a plurality of second images during a plurality of second gate periods each following a corresponding one of the plurality of second light pulses;
        wherein a gate opening time of each of the plurality of second gate periods follows a pulse emission starting time of the corresponding one of the plurality of second light pulses by a second delay time;
    wherein the second delay time is longer than the first delay time and the second target distance range is more distant than the first target distance range; and wherein the timing controller sets the first light emission cycle and the second light emission cycle to be greater than a longest-distance delay time, the longest-distance delay time being a time from a longest-distance pulse emission starting time to a longest-distance gate opening time of a longest-distance range of the plurality of target distance ranges.

7. The control device according to claim 6,
wherein the longest-distance delay time is determined from a light emission intensity and a diffusion angle of the light pulses and a sensitivity of the image acquisition unit.

8. The control device according to claim 7,
wherein the light emitting unit is configured to decrease the light emission intensity to image the first target distance range and increase the light emission intensity to image the second target distance range.

9. An image acquiring method for a vehicle, comprising:
emitting a plurality of first light pulses at a first light emission cycle rate, the plurality of first light pulses each having a first light emission period;
acquiring a plurality of first images during a plurality of first gate periods each following a corresponding one of the plurality of first light pulses, wherein a gate opening time of each of the plurality of first gate periods follows a pulse emission starting time of the corresponding one of the plurality of first light pulses by a first delay time;
emitting a plurality of second light pulses at a second light emission cycle rate, the plurality of second light pulses each having a second light emission period;
acquiring a plurality of second images during a plurality of second gate periods each following a corresponding one of the plurality of second light pulses, wherein a gate opening time of each of the plurality of second gate periods follows a pulse emission starting time of the corresponding one of the plurality of second light pulses by a second delay time;
wherein the second delay time is longer than the first delay time; and
wherein the first light emission cycle and the second light emission cycle are greater than a longest-distance delay time, the longest-distance delay time being a time from a longest-distance pulse emission starting time to a longest-distance gate opening time of a longest-distance range.

10. The image acquiring method according to claim 9,
wherein the longest-distance delay time is determined from a light emission intensity and a diffusion angle of the light pulses and a sensitivity of the image acquisition unit.

11. The image acquiring method according to claim 10, further comprising:
decreasing the light emission intensity of the plurality of first light pulses and increasing the light emission intensity of the plurality of second light pulses.

* * * * *